United States Patent [19]
Akiyama et al.

[11] Patent Number: 5,986,724
[45] Date of Patent: Nov. 16, 1999

[54] LIQUID CRYSTAL DISPLAY WITH LIQUID CRYSTAL LAYER AND FERROELECTRIC LAYER CONNECTED TO DRAIN OF TFT

[75] Inventors: Masahiko Akiyama, Tokyo; Tsuyoshi Hioki; Yutaka Nakai, both of Yokohama, all of Japan

[73] Assignee: Kabushiki Kaisha Toshiba, Japan

[21] Appl. No.: 08/806,384

[22] Filed: Feb. 27, 1997

[30] Foreign Application Priority Data

Mar. 1, 1996 [JP] Japan ........................................ 8-45073
Mar. 1, 1996 [JP] Japan ........................................ 8-45074

[51] Int. Cl.$^6$ ........................... G02F 1/136; G02F 1/135; G09G 5/00
[52] U.S. Cl. ................................ 349/41; 349/42; 349/49; 345/9
[58] Field of Search .................. 349/37, 42, 41, 349/49; 345/97, 92, 9

[56] References Cited

U.S. PATENT DOCUMENTS

| | | | |
|---|---|---|---|
| 4,021,798 | 5/1977 | Kojima et al. | 350/336 |
| 4,850,680 | 7/1989 | Yamazaki et al. | 349/37 |
| 4,944,575 | 7/1990 | Aigrain et al. | 349/37 |
| 4,978,203 | 12/1990 | Yamazaki et al. | 349/37 |
| 4,995,706 | 2/1991 | Inujima et al. | 349/37 |
| 5,225,821 | 7/1993 | Soto | 349/37 |
| 5,282,069 | 1/1994 | Sato | 349/37 |
| 5,473,449 | 12/1995 | Takemura et al. | 349/37 |

*Primary Examiner*—William L. Sikes
*Assistant Examiner*—Kari M. Horney
*Attorney, Agent, or Firm*—Finnegan, Henderson, Farabow, Garrett & Dunner, L.L.P.

[57] ABSTRACT

A liquid crystal display device having a liquid crystal layer driven by a data signal which comprises a TFT for selecting the data signal; and a ferroelectric layer of which a polarized state is controlled corresponding to the data signal selected by the TFT, and the liquid crystal layer responds to the polarized state of the ferroelectric layer, and the liquid crystal layer is driven when the liquid crystal layer responds to the polarized state of the ferroelectric layer. Since the ferroelectric layer can keep stable the polarized state for a long duration, a driving frequency can be reduced substantially to a substantially DC level, and power consumption is reduced to a great extent. In addition, the ferroelectric layer formed in a pixel divides the liquid crystal corresponding to the polarized domains of the ferroelectric layer, thereby showing an analogous grayscale image.

22 Claims, 21 Drawing Sheets assumed domain assumed domain wall assumed domain

LIQUID CRYSTAL DISPLAY WITH LIQUID CRYSTAL LAYER AND FERROELECTRIC LAYER CONNECTED TO DRAIN OF TFT

BACKGROUND OF THE INVENTION

1. Field of the Invention

The present invention relates to a liquid crystal display device and a substrate, and more particularly to a liquid crystal display device which can make gradational display.

2. Description of the Related Art

Liquid crystal displays are flat and low power consumers and are extensively used for notebook computers. One of remarkable features of the liquid crystal display device is its particularly low power consumption as compared with other display devices such as CRTs and plasma displays, and its future application to portable information-processing equipment is expected.

Such portable equipment is desired to have a display which consumes low power of 500 mW or below, and preferably several mW. In response to such a demand, a reflective type liquid crystal display device, which is a simple matrix type using a TN (twisted nematic) liquid crystal, does not need a back light and has only a low power consumption, has been used conventionally. But, this display has a disadvantage that since the TN type needs a polarizing plate, its reflectance is about 30% and dark. Besides, the simple matrix type has a disadvantage that when the number of pixels is increased, contrast is lowered, and display image quality is deteriorated. Therefore, using a PCGH (phase change guest host type) mode liquid crystal not requiring to use a polarizing plate and driving by active matrices, it has been attempted to produce a display provided with a high reflectance and a high contrast.

FIG. 1 shows one example of the circuit structure of a pixel in a conventional liquid crystal display device. This circuit structure of the pixel shown in FIG. 1 is the same as a conventional transmission active matrix liquid crystal display device. When a thin film transistor 1301 is turned on by a scan signal applied to a gate line 1304, a display signal voltage applied to a data line 1305 is applied to a liquid crystal layer 1303. And, an electrical charge is applied to a storage capacitance 1302 by a storage capacitance line (Cs line) 1307. As it is known well, it is generally necessary to apply an alternating voltage to the liquid crystal layer 1303, and the display signal voltage, which becomes positive or negative with a voltage of an opposed electrode 1306 formed on an opposite substrate at the center, is applied to the signal line 1305 to drive the pixel.

Such a liquid crystal display device needs the application of an alternating voltage to the liquid crystal layer even when the display does not change at all.

Therefore, a pixel potential is renewed whenever selected by frame cycling. Power consumption P when an alternating voltage is applied to the capacitance is expressed as follows:

$$p = f \times V^2 \times C$$

where, f denotes a frequency, V a voltage, and C capacitance. Therefore, the higher the frequency, the higher the voltage or the higher the capacitance, the higher the power consumption becomes.

For the AC drive of the liquid crystal display device, the drive frequency of each pixel is a frame frequency, the drive frequency of a data line is the product of a frame frequency and the number of scan lines, the drive frequency of a data line driver IC is the product of the number of all pixels on the screen and a frame frequency, and, if a division drive is performed, it is a value obtained by further dividing by a division number. For example, in a diagonally 10.4-inch color VGA (640×RGB×480 pixels) liquid crystal display device, a data line IC has power consumption of about 1 W. Therefore, an A4-size 150 dpi-equivalent high definition liquid crystal display device has the number of pixels of about 1600×1200 6.25 times greater than VGA, resulting in a disadvantage that power consumption is so high as 2 to 3 W or more. When a high power-consuming liquid crystal display device is used for any portable information-processing equipment, there are disadvantages that a battery exhausts soon and the usable duration is shortened.

On the other hand, it is known that power consumption can be reduced by using a bistable ferroelectric liquid crystal (SSFLC). Since the ferroelectric liquid crystal has a memory, the voltage supply can be stopped if the screen is not changed. But, the bistable ferroelectric liquid crystal has a disadvantages in that its orientation is disturbed by an impact, resulting in a screen failure. Therefore, it cannot be used as a portable display device. Besides, the liquid crystal having memory often has its contrast and reflectance limited, and its display has a problem in quality. For example, it concerns a display mode, which needs a polarizing plate, of the SSFLC, and the screen is dark with the reflectance of about 30%. Besides, since what is displayed by the SSFLC is basically limited to a binary display because it is bistable, its presentation capacity (namely, a volume of information) is lowered to great extent as compared with the display mode which can make gradation display. This constitutes a very serious problem in making a color display. When spatial light modulation is made by a dither method or the like to make the gradation display, effective resolution is degraded. Besides, when temporal modulation is made by frame rate control or the like, a flicker takes place, thus the SSFLC cannot be applied to animations.

On the other hands, conventional liquid crystal display devices generally obtain halftone display by changing the transmittancy of liquid crystal with a voltage applied to the liquid crystal. As compared with other methods, the liquid crystal display device has a relatively simple structure and drive method, and can make full color display by applying a voltage in an analog fashion.

Halftone or gray scale display by controlling the voltage applied to the liquid crystal can be applied to, for example, a TN liquid crystal which has a moderate threshold property. But, it cannot be applied to a liquid crystal which has a sharp threshold property and a good binary displaying property, such as a ferroelectric liquid crystal and an antiferroelectric liquid crystal.

In response to the demands for a liquid crystal display device having a wide angle of visibility and a quick response in these years, a ferroelectric liquid crystal and an antiferroelectric liquid crystal which are good in binary displaying property are attracting attention.

Since the ferroelectric liquid crystal has a sharp threshold property, it is suitable for a binary display but not suitable for a halftone display. Therefore, various studies have been made to provide a halftone display.

Some of such studies are based on the limit of a spatial resolving power of human eyes, including a dither method by which a single pixel is spatially divided into a plurality of pixels and a binary display is made by the respective divided pixels to make a gradation display, and a field thinning method by which a temporal ratio between a light state and a dark state is controlled to make a gradation display.

And, an attempt has been made to make a gradation display with a voltage applied by varying the optical response of a liquid crystal material itself to make a threshold value smooth.

However, the application of such existing techniques to a binary liquid crystal display device having an excellent displaying performance is not effective to achieve a gradation display at a practical level.

When the liquid crystal material itself is modified to make a threshold property moderate, there is a disadvantage for a ferroelectric liquid crystal, for example, that good properties such as a high-speed response and a memory are deteriorated. And, there is another disadvantage that the stability of a liquid crystal material is deteriorated.

And, when the halftone display is made according to a drive method such as a field thinning method or the like, a volume of data to be sent to each frame becomes enormous with the increase of the number of gradations, and the treatment is limited. Besides, there is another disadvantage of causing a flicker.

Since the dither method divides a single pixel into a plurality of very small pixels, it has disadvantages that the production of a liquid crystal display device is subdivided, resulting in lowering a yield and making the production process complicated. Besides, since it is necessary to drive the respective very small pixels, the drive system is also complicated heavily.

Furthermore, the number of gradations which can be displayed depends on the divided number of a single pixel, so that additional division is required to increase the number of gradations, and an analog full-color display is essentially impossible.

As described above, the displays for a personal computer and portable information-processing equipment show mostly still images, and an alternating voltage is supplied to a data line even when the screen is not changed, resulting in waste of power.

In view of the circumstances, the present invention aims to remedy the above-described disadvantages and to provide a liquid crystal display device which does not consume much power.

And, the invention aims to provide a liquid crystal display device which enables gradation display and provides high resolution, high image quality display.

The invention has been completed to remedy the above-described disadvantages. Specifically, the invention aims to provide a liquid crystal display device which can make a gradation display without being limited by the threshold property of a liquid crystal material. And, the invention aims to provide a liquid crystal display device which can make a gradation display without deteriorating the remarkable properties such as a high-speed response and a memory of a liquid crystal having a sharp threshold property.

In addition, the invention aims to provide a liquid crystal display device which can make a gradation display without subdividing a pixel electrode.

SUMMARY OF THE INVENTION

To solve the above problems, the liquid crystal display device of the invention has the following features.

A first aspect of the invention is a liquid crystal display device having a liquid crystal layer driven by a data signal which comprises a selecting means for selecting the data signal; and a ferroelectric layer of which a polarized state is controlled corresponding to the data signal selected by the selecting means, and the liquid crystal layer responds to the polarized state of the ferroelectric layer. Namely, the liquid crystal layer is driven when the liquid crystal layer responds to the polarized state of the ferroelectric layer.

The response of the liquid crystal layer to the ferroelectric layer may be made in any form. For example, the response includes a response to an electromagnetic field formed by the ferroelectric layer, a response to an electromagnetic field formed by a conductive layer by which electrically effected the polarized state of the ferroelectric layer, and a response to a polarization charge induced on the surface of the ferroelectric layer. And, such interactions may be combined to drive the liquid crystal layer.

The liquid crystal layer responds to the polarization charge induced on the surface of the ferroelectric layer when liquid crystal molecules are oriented (order is formed) according to the polarization charge induced on the surface of the ferroelectric layer. In addition, the shape of the ferroelectric layer is changed by its own piezoelectrical characteristics and this cause the response of the liquid crystal layer. Therefore it is possible to control the orientation or the phase change of the liquid crystal based on such a piezoelectrical transformation induced corresponding to the data signal in the ferroelectric layer.

The selecting means includes a nonlinear switching element such as a TFT (Thin Film Transistor). And, a scan line is connected to the TFT's gate, and the TFT's source drain is intervened between a data line and a ferroelectric substance.

The data signal is sufficient when it changes the polarized state of the ferroelectric layer, and its waveform (profile) is insignificant. The voltage applied to the liquid crystal is not necessarily required to invert its polarity by changing the corresponding data signal, however, it is desired to invert in order to prevent the liquid crystal from being deteriorated and the display image from being stuck or jammed. And, by designing to apply an alternating voltage in a cycle of one tenth or below of an internal time constant of the liquid crystal, the data signal withstands a voltage variation of 10%. In other words, by applying an alternating voltage in a cycle smaller than the internal time constant of the liquid crystal, degradation of contrast due to self-discharge can be prevented from occurring, and high image quality can be kept.

The ferroelectric layer may be exposed directly to the liquid crystal or may have an insulation layer or an electrode such as a pixel electrode therebetween. In other words, the interaction between the ferroelectric layer and the liquid crystal layer may be made directly or indirectly. In any event, a state that the liquid crystal layer is influenced by the polarized state of the ferroelectric layer, and the liquid crystal is driven by their interaction is included in the scope of the invention.

In other words, the liquid crystal display device according to the invention drives the liquid crystal according to the polarized state of a ferroelectric substance (e.g., an electric field formed by a polarization of the ferroelectric layer). Since the ferroelectric layer has memory and can keep stable the polarized state for a long duration, a driving frequency of the liquid crystal layer can be reduced substantially to a very low level (e.g., a substantially DC level), and power consumption is reduced to a great extent. Besides, by using, for example, a transistor to apply a voltage to the ferroelectric layer, the polarized state of the ferroelectric layer can be controlled precisely and a halftone (grayscale) can be displayed without being affected by noises from a wiring for selecting and driving the pixels of scan lines and data lines. For example, gradation can be displayed by changing a ratio of a plurality of regions having a different polarization direction, a polarized domain, for example, and configuring the ferroelectric layer.

A second aspect of the liquid crystal display device according to the invention is a liquid crystal display device which comprises a liquid crystal layer intervened between a first substrate and a second substrate; a first electrode formed on the first substrate; a selecting means for selecting a data signal and for applying the data signal to the first electrode; and a ferroelectric layer formed on the first electrode so that at least a part of the ferroelectric layer is interacted with the liquid crystal layer. The interaction between the ferroelectric layer and the liquid crystal layer may be made directly or indirectly as described above.

The present invention covers a case that at least a part of the ferroelectric layer is faced with the liquid crystal layer directly or indirectly. This directly facing of the ferroelectric layer with the liquid crystal layer includes a case that they are mutually contacted with an insulator layer such as an oriented film therebetween in addition to a case that the ferroelectric layer is directly contacted with the liquid crystal layer, and also include a case that a conductive layer is located between the ferroelectric layer and the liquid crystal layer. The same is applied in the following description even when it is not specifically described.

When the ferroelectric layer is faced with the liquid crystal layer, namely when they are directly interacted, the ferroelectric layer serves also as a so-called pixel electrode or a reflector when the LCD is a reflective type.

And, the invention also includes that the liquid crystal display device further comprises a second electrode formed on the ferroelectric layer so that the ferroelectric layer and the liquid crystal layer are interacted through the second electrode. In this case, an electric field formed by the polarization of the ferroelectric substance is moderated uniformity within the pixel and applied to the liquid crystal layer.

In addition, the ferroelectric layer is not required to be perfectly piled with the first electrode or the second electrode, but partial overlapped structure is sufficient. In this case, it is sufficient by having the ferroelectric layer locally located on a part of the pixel, and the flexibility of the ferroelectric layer with respect to the thickness control and material selection is enhanced, and productivity is promoted. Further, the voltage to the liquid crystal layer is uniformly applied by virtue of the second electrode. Furthermore, where the present invention is applied to a transmission type liquid crystal display device, the efficiency of using light can be improved because it is not necessary to form the ferroelectric layer, which might reduce the transmittance, on the whole surface of the pixel.

For the first substrate and the second substrate, an insulating substrate having transmittance such as a glass substrate is available. Where the present invention is to be applied to a reflective type liquid crystal display device, one of the substrates placed back side of the liquid crystal layer is not required to be transparent.

A third aspect of the liquid crystal display device according to the invention is a liquid crystal display device which comprises a liquid crystal layer intervened between a first substrate and a second substrate; a ferroelectric layer formed on the first substrate; a first electrode formed on the ferroelectric layer; and a selecting means for selecting a data signal and for applying the data signal to the first electrode. The ferroelectric layer is controlled to a prescribed polarized state corresponding to the data signal voltage selected and applied to the first electrode by the selecting means. And, by directly or indirectly responding to the polarized state of the ferroelectric layer, the liquid crystal layer is driven to show images on the display.

The invention covers also a liquid crystal display device which further comprises a second electrode formed beneath the ferroelectric layer. In this case, the first electrode and the second electrode are at least coupled electrically in part through the ferroelectric layer.

The first electrode and the second electrode may have a prescribed form of pattern. For example, the invention also includes a liquid crystal display device in which the first electrode has at least one slit and the ferroelectric layer is partly faced directly with the liquid crystal layer. In this case, a voltage required for controlling the polarized state of the ferroelectric layer is reduced. The pattern is not limited to one which have a slit but may be formed in a mesh pattern or a grid pattern.

Besides, in the invention, the first elect rode or the second electrode may comprise a plurality of portions having a different potential are applied. For example, the first electrode may comprise a first finger having a first potential and a second finger having a second potential different from the first potential.

Where the first electrode comprises the first finger and the second finger each having a different potential, the ferroelectric layer has its polarized state controlled by an electric field formed between the first finger and the second finger, mainly applied in parallel to the ferroelectric layer.

Therefore, the polarization of the ferroelectric layer is manly induced in a different direction on a surface parallel to the ferroelectric layer.

For example, it is possible that the ferroelectric layer having a first area substantially a rectangular shape within the pixel, the first finger is formed elongated with a first side of the first area of the ferroelectric layer, and the second finger is formed elongated with a second side of the first area, which is opposed to the first side, of the ferroelectric layer. In this case, a polarization is induced on the ferroelectric layer by the electric field formed by the first finger and the second finger. A ground potential may be applied to one of the first finger or the second finger. Besides, the first finger and the second finger are not limited to a single pair, but may be provided in a plurality of pairs. For example, when the first finger is formed elongated with a third side of the substantially rectangular first area of the ferroelectric layer and the second finger is formed elongated with a fourth side which is opposed to the third side, a plurality of electric fields having a different direction can be formed in the face parallel to the ferroelectric layer. It is also possible to form the first electrode having a pattern such as an interdigital electrode or a pair of interdigital transducer (IDT) of a SAW (surface acoustic wave) device.

On the first electrode patterned, an insulator layer such as a passivation film or an oriented film may be formed, and a third electrode (e.g., a reflective electrode) may further be formed on the insulator layer. In this case, the first electrode is also electrically coupled with the third electrode, and the polarized component of a paraelectric capacitor also contributes to interact with the liquid crystal layer.

The liquid crystal display device in the invention includes to control a polarized state of the ferroelectric layer so as to change an orientation of liquid crystal molecules between the substantially normal direction and the direction, in-plane of the substrate which the liquid crystal layer is intervened. It is also possible to control an orientation of liquid crystal molecules without controlling an electric field formed by the ferroelectric layer as described above.

In addition, the liquid crystal display device in the invention includes to form the electrode including the first electrode, the first finger and the second finger so that the polarized direction of the ferroelectric layer is controlled between the substantially normal direction and the direction in-plane of the ferroelectric layer. Thus, the electric field formed by the ferroelectric layer having at least two different direction, which is substantially the normal direction and the direction parallel to the substrate of the liquid crystal display device for example. Therefore, without controlling the electrical field applied to the liquid crystal layer, the orientation of the liquid crystal molecules is controlled directly by interacting with the polarized direction of the ferroelectric layer. The polarized direction of the ferroelectric layer and the oriented direction of the liquid crystal molecules can be different if they are corresponding to be changed.

A fourth aspect of the liquid crystal display device of the invention is a liquid crystal display device which comprises a liquid crystal layer intervened between a first substrate and a second substrate; a first electrode formed on the first substrate; a selecting means for selecting a data signal and for applying the data signal to the first electrode; a ferroelectric layer of which a polarized state is controlled by an electromagnetic field formed by the first electrode, and has the liquid crystal layer respond to the polarized state; and a holding means for holding a potential applied to the first electrode when the data signal is not selected by the selecting means.

The holding means comprises, for example, a supply wiring through which a predetermined potential is supplied and a capacitance inserted between the supply wiring and the first electrode. When the selecting means is off, a potential may be supplied to the capacitance between the supply wiring though which the prescribed potential is supplied and the first electrode so as to keep the potential of the first electrode.

For the supply wiring, a scan line at a foregoing or subsequent pixels may be used. By configuring as described above, when the selecting means is not in a selection state, namely the ferroelectric layer performs the memory driving, the potential of the first electrode can be prevented from being fractuated.

In addition, the signal which reset the polarized state of the ferroelectric layer is not only applied from the data line but also applied via the holding means, Cs line and so on. It is possible to have a designated line to apply the signal reset the polarized state of the ferroelectric layer.

A fifth aspect of the liquid crystal display device of the invention is a liquid crystal display device which comprises a liquid crystal layer intervened between a first substrate and a second substrate; a first electrode formed on the first substrate; a first scan line applying for a first scan signal; a signal line for applying a data signal; a first switching element applying the data signal to the first electrode the switching element is turned on by the first scan signal; a ferroelectric layer of which a polarized state is controlled by an electromagnetic field formed by the first electrode, a polarized state of the ferroelectric layer is controlled corresponding to the data signal selected by the selecting means, and the liquid crystal layer responds to the polarized state of the ferroelectric layer; a strobe wiring for applying a predetermined potential; and a second switching element intervened between the first electrode and the strobe wiring, the second switching element is turned on when the first switching element is turned off and applying the predetermined potential applied on the wiring to the first electrode. The strobe wiring is a wiring which a signal to have a synchronism is applied.

For the second switching element, it is possible to use a switching element which has a reversed polarity from the first switching element, turns on when the first switching element is turned off according to the first scan signal, and applies the potential of the strobe wiring to the first electrode. For example, an n-channel TFT may be used for the first switching element, a p-channel switching element for the second switching element, and vice versa.

In addition, the liquid crystal display device further comprises a second scan line for applying a second scan signal having an reversed phase to the first scan signal, and a TFT having the same polarity can be used as the first and second switching elements.

By configuring as described above, operation while the images screen is not changed can be eliminated completely. When the first switching element is turned off, the memory drive state starts immediately and the potential of the first electrode is held.

The holding means for the potential of the first electrode while the first switching element is off may serve to hold by another method in addition to the above-described method.

A sixth aspect of the liquid crystal display device of the invention is a liquid crystal display device which comprises a first displaying means for adding or subtracting a first color, the first displaying means having a first liquid crystal layer, a selecting means for selecting a first data signal, and a first ferroelectric layer of which a polarized state is controlled corresponding to the first data signal, the first liquid crystal layer responds to the polarized state of the ferroelectric layer; a second displaying means for adding or subtracting a second color which piled on the first displaying means, the second displaying means having a second liquid crystal layer, a selecting means for selecting a second data signal, and a second ferroelectric layer of which a polarized state is controlled corresponding to the second data signal, the second liquid crystal layer responds to the polarized state of the ferroelectric layer; and a third displaying means for adding or subtracting a third color which piled on the second displaying means, the third displaying means having a third liquid crystal layer, a selecting means for selecting a third data signal, and a third ferroelectric layer of which a polarized state is controlled corresponding to the third data signal, the third liquid crystal layer responds to the polarized state of the ferroelectric layer.

The invention relates to a liquid crystal display device which displays in color by additive color mixing by absorbing C (cyan), M (magenta) or Y (yellow), or by subtractive color mixing of R (red), G (green) and B (blue).

In this invention, the ferroelectric layer can be formed only of a ferroelectric substance. However the ferroelectric layer can be a melange formed of ferroelectrics and paraelectrics. It is possible to disperse grains of ferroelectrics which are fine grained or pillar shaped, into the layer formed of paraelectrics.

A seventh aspect of the liquid crystal display device of the invention comprises a liquid crystal layer intervened between a first substrate having a first electrode and a second substrate having a second electrode; and a ferroelectric layer formed on at least one of the first substrate or the second substrate so that the liquid crystal layer is interacted with the ferroelectric layer, and the ferroelectric layer having a first domain polarized in a first direction and a second domain polarized in a second direction; and a shifting means for shifting a boundary of the first domain and the second domain.

The liquid crystal display device of the invention forms the ferroelectric layer within a pixel to control the distributed states of the first domain and the second domain within the ferroelectric layer, thereby driving the liquid crystal layer in the pixel. The ferroelectric layer can be a ferroelectric monocrystal, ferroelectric polycrystal or ferroelectric liquid crystal layer.

The term domain here means a region which has a prescribed polarized direction as the whole therein, and the domain may include very small regions having a different polarized direction. It is to be included that all parts forming the domain may be polarized in substantially the unified direction. For example, when the ferroelectric layer is made of a ferroelectric polycrystal, the first domain and the second domain are regions which have a prescribed polarization direction as the whole. And, the first domain may include therein a portion (e.g., small crystals forming a plurality of crystallites) which has a polarization direction different from that of the first domain. In addition, it is possible to treat a certain region as a domain, if the region having a polarized direction as a whole in the ferroelectric polycrystal layer (see FIG. 15B). In such cases, the domain wall is a boundary of the region having a polarized direction as a whole.

As described above, the interaction between the liquid crystal layer and the ferroelectric layer includes, for example, an interaction with an electric field generated by a ferroelectric layer, an interaction with an electric field generated by a conductive layer electrically effected by the polarized state of the ferroelectric layer or a conductive layer electrically coupled with a ferroelectric layer, and an interaction with a polarization charge induced on the surface of a ferroelectric layer.

Where this invention is applied to an active matrix liquid crystal display device, a first substrate may be a substrate with the switching matrix array and a second substrate an opposed substrate, and vice versa. Therefore, the first electrode and the second electrode may be a pixel electrode or an opposed electrode. In other words, the ferroelectric layer may be formed on the side of the substrate with the switching matrix array or on the side of the opposed substrate.

One embodiment of a structure of the liquid crystal display device of the invention comprises a liquid crystal layer intervened between a first substrate having a first electrode and a second substrate having a second electrode; a ferroelectric layer formed on at least one of the first substrate or the second substrate and having a first domain polarized in a first direction where a first electric field is applied to the liquid crystal layer and a second domain polarized in a second direction where a second electric field is applied to the liquid crystal layer; and a domain boundary shifting means for shifting a boundary of the first domain and the second domain by applying an electric field to the ferroelectric layer.

The shifting means for shifting the domain boundary of the ferroelectric layer controls so as to vary a ratio of the first domain and the second domain of the ferroelectric layer. For example, by forming a dielectric layer capacitive-coupled with the ferroelectric layer, the domain distribution of the ferroelectric layer is controlled.

The shifting means includes a dielectric layer formed of, for example, a paraelectric substance, which is formed on the ferroelectric layer and has a first region having a first thickness and a second region having a second thickness. When an electric field is applied to the laminated ferroelectric layer and dielectric layer, an electric field strength to be applied to the ferroelectric layer is varied according to the thickness distribution of the dielectric layer. Therefore, the distribution of the first domain and the second domain can be changed by varying a display signal voltage to be applied to the pixel electrode, for example.

And, the shifting means can also be a dielectric layer formed of, for example, a paraelectric substance, which is formed on the ferroelectric layer and has a first region having a first dielectric constant and a second region having a second dielectric constant. When an electric field is applied to the laminated ferroelectric layer and dielectric layer, an electric field strength to be applied to the ferroelectric layer is varied according to the distribution of a dielectric constant of the dielectric layer. Therefore, the distribution of the first domain and the second domain can be changed by varying a display signal voltage to be applied to the pixel electrode, for example. The distribution of a dielectric constant can be formed by doping ions which vary the dielectric constant into the dielectric layer, for example.

The dielectric layer may be a paraelectric substance or another ferroelectric layer.

Besides, the domain boundary shifting means can have a dielectric layer which has a thickness distribution and dielectric constant distribution in a pixel, or can use a ferroelectric layer itself. In other words, by forming the ferroelectric layer so as to have a thickness distribution or a dielectric constant distribution, it can be used as the shifting means.

The liquid crystal display device of the invention having the ferroelectric layer itself as the shifting means comprises a liquid crystal layer intervened between a first substrate having a first electrode and a second substrate having a second electrode; and a ferroelectric layer formed on at least one of the first substrate or the second substrate so that the ferroelectric layer interacted with the liquid crystal layer, and the ferroelectric layer having a first region in a first thickness and a second region in a second thickness.

And, the liquid crystal display device of the invention comprises a liquid crystal layer; a second substrate which has the liquid crystal layer between a first substrate to form a plurality of pixel regions; an electrode formed in the pixel regions on the side faces of the first electrode and the second electrode which holds the liquid crystal therebetween; a pixel region dividing means which is formed of a ferroelectric layer formed on the electrode and having a first domain polarized in a first direction and a second domain polarized in a direction opposite from the first direction and which divides the pixel region into a first region and a second region by converting a macroscopic electric field to be applied to the electrode according to the polarization of the first domain and the second domain and applying them to the liquid crystal; and a domain boundary shifting means for shifting a boundary of the first domain and the second domain according to the macroscopic electric field to be applied to the pixel region.

The liquid crystal display device of the invention comprises a liquid crystal layer; a first substrate having a ferroelectric layer which is formed on a flat substrate formed of a transmissive monocrystal so as to have a polarization direction to be parallel to the normal line of the flat substrate; and a second substrate having the liquid crystal layer between the first substrate. The first substrate may be used as an opposed substrate.

The substrate provided within the liquid crystal display device of the invention may have a flat substrate formed of a transmissive (transparent or translucent) monocrystal, and a ferroelectric layer formed on the flat substrate so as to have c axis parallel to the normal line of the flat substrate.

The ferroelectric layer is preferably formed by substantially effecting epitaxial growth on a transmissive monocrystal substrate. One embodiment of the liquid crystal display device having such a ferroelectric layer of the invention comprises a liquid crystal layer which is intervened between a first substrate having a first electrode and a second substrate having a second electrode; a transmissive monocrystal formed on at least either the first substrate or the second substrate; and a ferroelectric layer which is formed on the transmissive monocrystal so as to interact with the liquid crystal layer and its polarization direction substantially parallel to a direction of the normal line of the transmissive monocrystal.

The ferroelectric layer may have a monocrystal ferroelectric layer formed thereon. Also, it may have a polycrystal ferroelectric layer formed thereon.

The liquid crystal display device of the invention will be described mainly on the interaction of the liquid crystal with an electric field formed by the ferroelectric layer. And, the same description can be applied to another interaction such as a response of the liquid crystal layer to, for example, a polarization charge in view of the point that a display signal is modulated according to the domain distribution of the ferroelectric layer.

The liquid crystal display device of the invention divides a voltage to be applied to the pixel electrode by the first domain and the second domain of the ferroelectric thin film to apply to the liquid crystal layer.

For example, a voltage to be applied to the pixel electrode is modulated by the first domain and the second domain of the ferroelectric thin film and applied to the liquid crystal, and arbitrary gradation display can be achieved by varying a ratio of volume between the first domain and the second domain.

The liquid crystal display device of the invention utilizes the mechanism of domain growth possessed by a ferroelectric substance in order to vary the ratio of volume between the first domain and the second domain.

For example, a ferroelectric substance such as barium titanate in a phase of a pyramidal quadratic system has a spontaneous polarization upward or downward with respect to the c axis of the crystal. Generally, the ferroelectric substance comprises regions which are called a domain. Polarizations in each domain are aligned in the same direction, but those in the next domain are aligned in a different direction.

FIG. 2A and FIG. 2B are schematic diagrams showing a polarization of the ferroelectric substance. FIG. 2A schematically shows displacement of atoms on both sides of a boundary of domains of a ferroelectric substance polarized in an opposite direction, and FIG. 2B schematically shows the domain structure with a 180° boundary between the domains polarized in an opposite direction.

In the example shown in FIG. 2A and FIG. 2B, the polarizations of the respective domains are directed in opposite directions. The net polarization of a crystal consisting of a plurality of domains is determined according to a difference in volume of a domain (a first domain) polarized upward and a domain (a second domain) polarized downward. For example, when domains mutually directed in opposite directions have the same volume, a crystal as the whole does not seem polarized.

A total dipole moment of the crystal is varied according to the motion of the domain boundary (partition) or the generation of a new domain. And, the domain boundary changes its size and shape when the strength of an electric field applied is changes.

Here, the 180° boundary (or 180° wall) means a boundary (wall) between domains (i.e., the first domain and the second domain) which have a polarization in a direction opposite from the ferroelectric substance. The domain boundary is not limited to the 180° boundary, but also at a 90° boundary or the like.

For example, an active matrix liquid crystal display device has generally a liquid crystal intervened between a pixel electrode connected to a nonlinear switching element and an opposed electrode to form a pixel region.

And, the orientation state or the phase state of the crystal are controlled by an electric field between both electrodes to control the transmission or not of light to enable displaying.

The liquid crystal display device of the invention has a ferroelectric layer formed within the pixel region to extend an electrical mutual interaction to the liquid crystal.

The location where the ferroelectric layer is disposed is not limited onto the pixel electrode but may be disposed on a location, i. e., an opposed substrate, where interaction with the liquid crystal can be performed. A macroscopic electric field applied between the pixel electrode and the opposed electrode is modulated by the domain structure of the ferroelectric layer and applied to the liquid crystal. Therefore, a single pixel is dividedly controlled in accordance with the domain structure of the ferroelectric layer within the pixel.

As described above, the ferroelectric substance is formed of the first and second domains mutually having a different polarization direction, so that the first domain and the second domain have a different orientation state of the liquid crystal even within the same pixel region. Therefore, even if the liquid crystal has a sharp threshold property, gradation display can be made without having the device complicated.

Gradation, namely the domain distribution within the pixel region, can be controlled in analog and digital fashions.

For example, when the ferroelectric layer is formed so to distribute the film thickness within the pixel region, the domain boundary is shifted in accordance with a macroscopic electric field to be applied (see FIG. 16A, FIG. 17A. By continuously distributing the film thickness, the domain distribution varies in an analog fashion according to the macroscopic electric field, and gradation also varies in an analog fashion. By distributing the film thickness intermittently, the domain distribution varies in a digital fashion according to the macroscopic electric field, and gradation also varies in a digital fashion.

And, even when the ferroelectric layer has a uniform thickness, by forming the dielectric film so as to distribute the film thickness on the ferroelectric layer within the pixel region, namely to make the dielectric constant distribution, the domain boundary shifts in accordance with the macroscopic electric field to be applied (see FIG. 16B, FIG. 17B). The formation of the dielectric film having the film thickness distribution is not limited onto the ferroelectric layer but may be on a position where the interaction is applied with the electrode and the ferroelectric layer, namely a position to face the ferroelectric layer through the pixel electrode.

By continuously distributing the dielectric constant, the domain distribution varies in an analog fashion according to the macroscopic electric field, and gradation also varies in an analog fashion. By distributing the dielectric constant intermittently, the domain distribution varies in a digital fashion according to the macroscopic electric field, and gradation also varies in a digital fashion.

Furthermore, the dielectric constant distribution may be formed of a plurality of dielectric substances having a different dielectric constant in addition to the thickness of the dielectric substance. For example, the liquid crystal display device exemplified in FIG. 41 has the dielectric constant distribution formed of a high dielectric constant material 12 and a low dielectric constant material 11.

FIG. 3 and FIG. 4 are schematic diagrams showing a pixel display state by the domain distribution of the ferroelectric layer.

FIG. 3 shows an example of using a liquid crystal having a sharp threshold property, wherein a light state and a dark state (pixel domain) within a pixel are distributed corresponding to the domain distribution of the ferroelectric layer. Since the threshold property is sharp, the light state and the dark state are intermittently distributed corresponding to the domain distribution. In other words, pixel domains in a binary display are distributed within the pixel, thus gradation display is made by the pixel.

FIG. 4 shows an example of using a liquid crystal having a moderate threshold property, wherein a light state and a dark state (pixel domain) within a pixel are distributed corresponding to the domain distribution of the ferroelectric layer, but the light state and the dark state are successively distributed. In other words, the pixel domains within the pixel are continuously distributed, making gradation display.

FIG. 5 to FIG. 7 are schematic diagrams showing a state of the domain distribution changing in the pixel. For example, when the domain boundary of the ferroelectric layer is shifted, the liquid crystal layer within the pixel region has the domain divided in accordance with the domain distribution of the ferroelectric layer as shown in FIG. 5 to FIG. 6.

FIG. 5 to FIG. 7 show domains (hatched) of the liquid crystal layer corresponding to the first domain. Description will be made of a liquid crystal having a high threshold property, but may also be applied to a liquid crystal having a moderate threshold property.

FIG. 5 shows a state that the first domain is almost nil (the ferroelectric layer as the whole is polarized in the polarization direction of the second domain). At the time, the pixel shows in a light state (or a dark state).

FIG. 6 shows a state that the first domain and the second domain are distributed in almost the same state. At this time, the pixel shows in an intermediate state between the light state and the dark state.

FIG. 7 shows that the pixel is almost in a state of the first domain (the ferroelectric layer as the whole is polarized in the polarization direction of the second domain). At the time, the pixel shows in a dark state (or a light state).

In the liquid crystal display device of the invention, by the domain distribution of the ferroelectric layer, the liquid crystal layer in the pixel region is also given domains, and gradation display is made.

Since the ferroelectric substance has memory owing to the remanence, the display state of the liquid crystal display device is held.

FIG. 8 is a schematic diagram showing a structure of the liquid crystal display device of the invention, and FIG. 9 shows the circuit structure of a single pixel of the liquid crystal display device shown in FIG. 8.

A liquid crystal layer 6 is intervened between a substrate with the switching matrix having a thin film transistor 3 formed and an opposite substrate having an opposite electrode 5 formed.

The thin film transistor 3 is turned on or off by a gate electrode 4. When the thin film transistor 3 is on, a potential to be applied to a data line (not shown in FIG. 8) is applied to a pixel electrode 2, an electric field is formed in the pixel region to be formed by the pixel electrode 2 and the opposed electrode 5 to control the orientation state and the phase (change) state of the liquid crystal layer 6, thereby displaying.

The liquid crystal display device of the invention modulates an electric field to be applied to the pixel region formed by the pixel electrode 2 and the opposed electrode 5 by the ferroelectric thin film to effect gradation display.

Since the ferroelectric crystal is formed of domains having a different polarization, the liquid crystal layer 6 is divided into pixel domains corresponding to the domains of the ferroelectric crystal, thereby controlling the orientation state and the phase change state.

For example, for the liquid crystal display device exemplified in FIG. 8, the ferroelectric thin film 1 may be formed of a ferroelectric substance which has a polarization axis parallel to the direction of normal line of the substrate.

It is more effective when the polarization axis and the direction of normal line of the substrate are mutually parallel. And, the ferroelectric substance may also be used to form a monocrystal ferroelectric layer.

And, the ferroelectric substance is preferably formed to have a prescribed size of domain to which the liquid crystal responds. For example, the ferroelectric substance undergone the epitaxial growth may be annealed.

FIG. 9 is a schematic diagram showing an example of the relation between the liquid crystal layer and the polarized state of the domains of the ferroelectric crystal. The liquid crystal is oriented corresponding to the polarized state of the domain.

When the polarization axis of the ferroelectric substance is in a direction of applying a voltage (a-b direction) and the remanence is given in the direction a or direction b, the ferroelectric crystal can be provided with a polarization direction.

FIG. 9 shows that when the amounts of polarization are same in the direction a and the direction b and there is no remanence, an electric charge is neutralized in a macroscopic viewpoint.

When it is assumed that an electric field is applied from the state of FIG. 9 in the direction b, the domain in the direction a is partly undergone polarization reversal, and the domain polarized in the direction b becomes large.

FIG. 10 is a schematic diagram showing a state that the polarization has remained as described above.

FIG. 11 is a schematic diagram showing the pixel electrode face at the time. Toward the inside of the pixel electrode face, a domain is formed corresponding to the domain of the ferroelectric monocrystal. In other words, the pixel (called a pixel domain) corresponding to the domain of the ferroelectric monocrystal polarized in the direction a has a large area, while the pixel domain in the direction b has a small area.

When the pixel domain has a sufficient size for the response by the liquid crystal at the time, a voltage to be applied to the liquid crystal is contrary between the pixel domain corresponding to the domain having the remanence polarized in the direction a and the pixel domain having the remanence polarized in the direction b, so that a binary display is modulated to a gradation display within the pixel region.

At this time, when it is determined that the application of a voltage in the direction a results in a light state and the application in the direction b results in a dark state, an arbitrary halftone can be displayed.

When a higher voltage is applied, the domain structures shown in FIG. 10 and FIG. 11 are changed as shown in FIG. 12 and FIG. 13, the region in the direction a or the light state becomes large.

Since the domain varies in an analog fashion with respect to the applied voltage, a display changes from a dark state to a light state in an analog fashion with respect to the applied voltage. Thus, an analog full-color display is achieved.

FIG. 14 is a schematic diagram showing that a macroscopic electric field to be applied to the pixel by the first electrode and the second electrode is divided by the domain structure of the ferroelectric monocrystal and applied to the liquid crystal layer (in a case of employing the monocrystal ferroelectric thin film).

In the liquid crystal display device of the invention, the size of the pixel domain depends on a size of the domain of the ferroelectric layer, a thickness or the magnitude of unevenness of the dielectric constant distribution (the size of a segment having a film thickness in a prescribed range or a thickness).

The minimum value of a typical diameter of the segment configuring a typical diameter, thickness or dielectric constant distribution of the domain of the ferroelectric layer may be determined to about one tenth to one second of a cell gap (a thickness of the liquid crystal layer). And, it is necessary to be set lower than the resolving power of a person's eyes.

In the liquid crystal display device of the invention that the volume of the domain polarized in a prescribed direction is varied within the pixel, and a macroscopic electric field to be applied to the pixel is modulated and applied to the liquid crystal layer; it is possible to use a thin film which is formed of an aggregate of crystallites such as ceramics in addition to the domain growth of the ferroelectric monocrystal.

For example, the ferroelectric layer may have an uneven surface, or a dielectric material having a dielectric constant distribution may be formed to distribute (irregulate) an amount of remanence of the ferroelectric substance within the pixel.

FIG. 15A and FIG. 15B are schematically show the polarized state of ferroelectric layer formed of a plurality of crystals. The region which having a prescribed polarized direction as the whole therein can be treated as a domain, and the domain can be formed of very small regions or crystals having a different polarized direction. FIG. 15A schematically showing a domain which ferroelectric crystals are aligned, wherein a single crystallite polarized in substantially the unified direction. FIG. 15B schematically showing a ferroelectric thin film in which ferroelectric crystals are aligned, and the first domain and the second domain are regions which have a prescribed polarization direction as the whole. It is possible to treat these region as a domain, if the region having a polarized direction as a whole in the ferroelectric polycrystal layer. In such cases, the domain wall is a boundary of the region having a polarized direction as a whole.

The polarization direction may be arranged in a single direction by, for example, polling. And, the ferroelectric thin film may be formed by a sol-gel method, for example. The ferroelectric thin film may have a remanence in the polling direction as the whole.

FIG. 16A and FIG. 16B are schematic diagrams showing the structure of a ferroelectric film provided for the liquid crystal display device of the invention for enabling a desired gradation display. The ferroelectric film formed in a pixel is partly shown.

FIG. 16A shows the ferroelectric film in the pixel with its thickness varied.

FIG. 16B shows a dielectric film formed on the ferroelectric film with its thickness varied within the pixel region. The dielectric film may be formed on the ferroelectric film with a pixel electrode therebetween in addition to the direct forming on the ferroelectric film.

In addition to the formation of the ferroelectric film on the pixel electrode, the ferroelectric film may be formed on any part such as the opposed substrate if a macroscopic electric field to be applied to the pixel electrode can be modulated and applied to the liquid crystal layer.

When the ferroelectric film is formed as shown in FIG. 16A or the dielectric layer is jointly formed with the ferroelectric film as shown in FIG. 16B, a macroscopic electric field to be applied to the pixel region is not applied uniformly, and only a region which exceeds a coercive electric field has the polarization direction reversed as shown in FIG. 17A and FIG. 17B. FIG. 17A and FIG. 17B show that the monocrystal grains in the ferroelectric film exemplified in FIG. 16A and FIG. 16B have undergone the polarization reversal, and the domain boundary has shifted.

FIG. 18 is a schematic diagram showing that the polarized state is continuously distributed on the ferroelectric film by forming the distribution on an electric field to be applied to the ferroelectric substance owing to the distribution or unevenness of the film thickness (in a case of the polycrystal ferroelectric thin film).

When a macroscopic electric field is applied to the pixel, a polarization in a region having a small thickness in the ferroelectric film becomes large. And, the polarization becomes small in a region having a great thickness. Therefore, the polarized state is continuously distributed on the ferroelectric film, enabling the gradation display.

Since the polarization reversal region can also be varied in an analog fashion with respect to a voltage applied, a gradation display from a dark to light state can be made in an analog fashion in the same mechanism as the domain growth.

And, in view of the properties of the ferroelectric substance, the polarized structure can be retained even after stopping the application of a voltage, so that the pixel division, namely the pixel domain, can be provided with memory. Therefore, the pixel dividing function and memory can be given to a liquid crystal such as a TN liquid crystal not having memory.

In addition, a response speed required for the polarization reversal of the ferroelectric substance is generally faster than an optical response speed of the liquid crystal. Accordingly, differing from conventional drive methods of a liquid crystal display device, respective pixels are driven at the polarization reversal speed of the ferroelectric substance, and the liquid crystal can be driven in compliance with the polarization reversal speed. Thus, the drive can be made in a shorter time than the conventional drive methods.

DESCRIPTION OF THE PREFERRED EMBODIMENTS (First embodiment)

Figure 19:
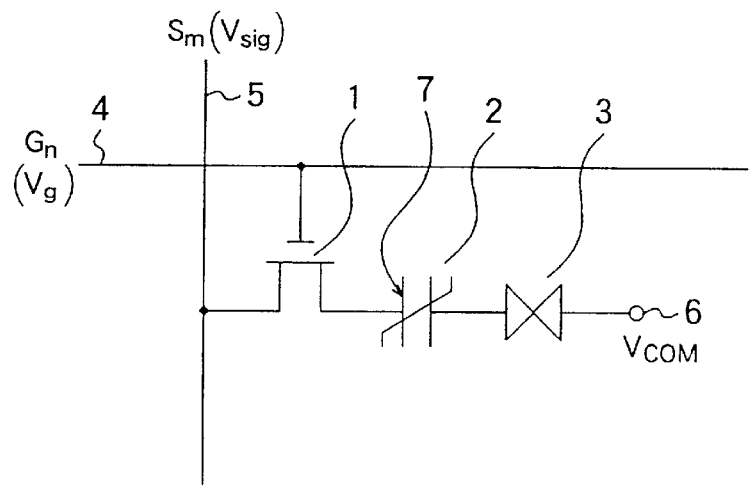
FIG. 19 is a circuit diagram of the pixel section in the liquid crystal display device of the invention.

FIG. 19 shows an equivalent circuit diagram of a single pixel in a liquid crystal display device of the invention.

As shown in FIG. 19, a unit pixel comprises a transistor 1, an electrode 7 connected to the transistor 1, a ferroelectric capacitance 2, a liquid crystal 3, and an opposed electrode 6 which determines another potential of the liquid crystal 3; and a potential of the electrode 7 is controlled through the transistor 1 connected to a scan line 4 and a data line 5.

Figure 20A:
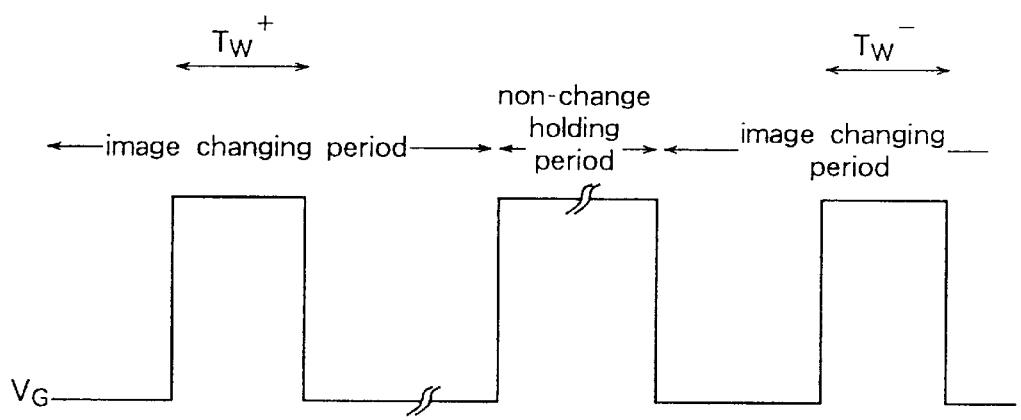
FIG. 20A and FIG. 20B are diagrams of a voltage waveform for driving the liquid crystal display device of the invention.
Figure 20A:
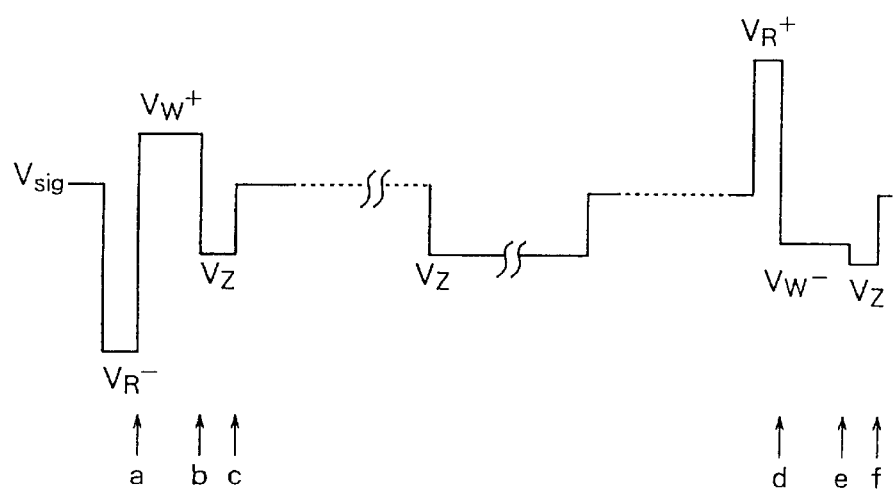
Figure 20B:
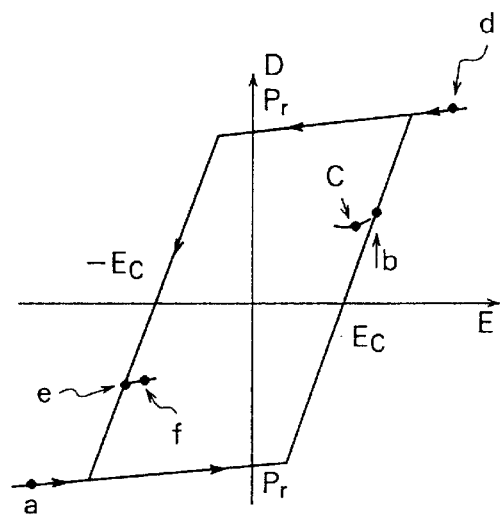

FIG. 20A shows an example of the voltage waveform in driving the liquid crystal having the above-described structure. FIG. 20B shows the operating point on an electric field-electric flux density (E-D) hysteresis of a ferroelectric substance.

When it is assumed that a positive signal writing time is $T_w^+$ when a signal is to be written into the pixel in question at a certain timing in a screen information update period, $V_R^-$ is applied to a voltage of the data line, and a polarization direction within the ferroelectric substance is saturated in a negative direction and aligned (point a in FIG. 20B).

Then, a voltage $V_w^+$ corresponding to an image signal is applied (point b in FIG. 20B), and a reference potential $V_Z$ is applied (point c in FIG. 20B), thereby completing the positive voltage writing cycle into a single pixel.

Upon completing the writing time, the transistor is turned off and the electrode potential to the ferroelectric substance is kept at $V_Z$, so that to write into another pixel, the polarized state of the ferroelectric substance of this pixel and the potential produced by a fixed charge which is generated by the polarization can be kept.

Display on the liquid crystal can be made in a reflective mode of a guest-host type, it is not necessary to vary the voltage of the data line until renewal is required, and the liquid crystal can be driven without consuming great power.

According to the drive method shown in FIG. 20A and FIG. 20B, when renewal of the screen is not required (a non-change retaining time) upon completing the screen renewing, a gate potential is raised to apply the reference potential $V_Z$ to the data line to write into the pixel, so that the potential of the electrode 7 is not subjected to a drift change due to a leakage current, and the potential to be applied to the liquid crystal can be prevented from being varied.

When a cursor is blinked, a mouse is moved, or a small scale of renewal is performed; there is no serious problem in writing data by selectively raising a voltage of the gate line only for the pixels to be renewed.

This drive method continues to keep the transistor on in the non-change retaining time, but the reference voltage may be written intermittently. If a resistance loss is caused in the peripheral drive circuit by applying a DC voltage, the intermittent writing is better to reduce the power consumption of the drive circuit.

And, the ferroelectric substance polarization saturation reversal, writing or reference voltage application was performed in one time in the pixel selecting time, but may be performed in two or more times. For example, the polarization saturation reversal may be performed on all pixels at the same time, and then, writing of a prescribed voltage $V_w^+$ may be performed on each pixel. In addition, the reset voltage $V_R$ is applied not only from the data line but also applied from a designated line. It is possible to employ an independent reset line to apply the reset signal $V_R$.

The equivalent circuit of the liquid crystal can be indicated by a leak resistance which is connected in parallel to the liquid crystal capacitance, but can be driven by the above-described writing only if its time constant is large enough. If the display time becomes long considerably with respect to the time constant, the polarity of a voltage to be applied to the liquid crystal may be changed with appropriate timing (in a prescribed or irregular cycle). FIG. 20A and FIG. 20B show doing so at a negative data writing time is $T_w^-$ the second-half image changing period. In this case, the polarization is aligned in the positive direction with a voltage $V_R^+$ (point d in FIG. 20B), a predetermined signal $V_w^-$ is applied (point e in FIG. 20B), and the reference potential $V_Z$ is written (point f in FIG. 20B). In addition, the reference potential $V_Z$ can have different levels corresponding to the case of $V_R^-$, $V_w^+$ and $V_R^+$, $V_w^-$.

For example, the level of the reference potential $V_Z$ is set corresponding to a coercive electric field $E_C$ and the thickness of the ferroelectric layer d as shown below.

$$V_Z = \pm V_C = \pm E_C \times d$$

When it is adopted to apply an alternating voltage in a cycle of one tenth of the time constant of the liquid crystal, the polarity is reversed when the voltage is reduced by 5%, and a luminance change rate at the time of reversal becomes about the same, it is noticeable but allowable.

At the time of polarity reversing drive, even when the number of pixels increases, a voltage applied to the ferroelectric substance and the liquid crystal can be controlled accurately by virtue of the structure of the invention, so that the absolute values of positive and negative voltages can be made equal, and an image with high quality can be obtained without involving the occurrence of image sticking due to the application of a DC voltage to the liquid crystal.

It is also effective to drive the time of applying the positive or negative voltage so that the system can store according to an appropriate method and the positive and negative balance can be taken for a long time.

(Second embodiment)

Figure 21:
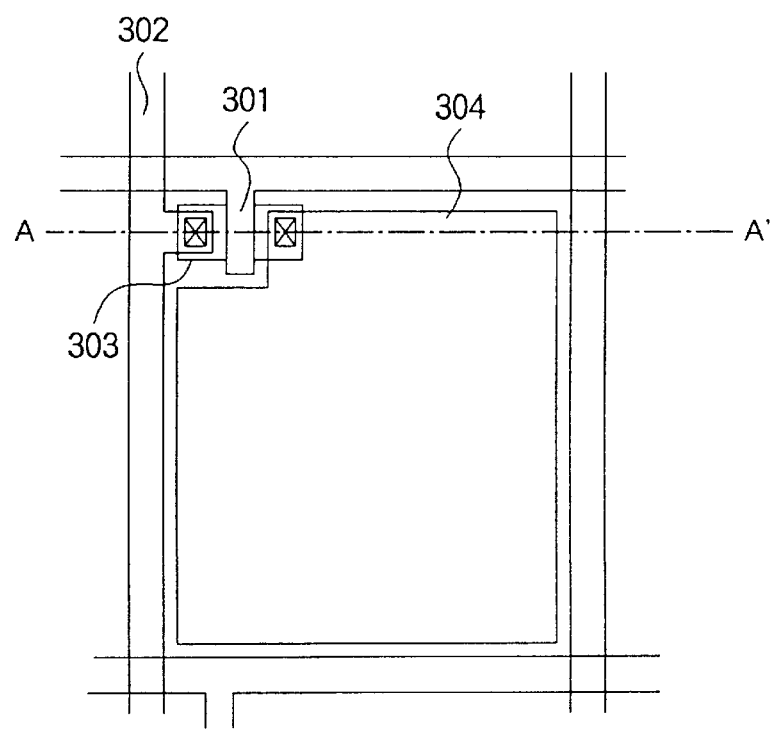
FIG. 21 a plan view showing an example of the pixel structure the liquid crystal display device of the invention.
Figure 22:
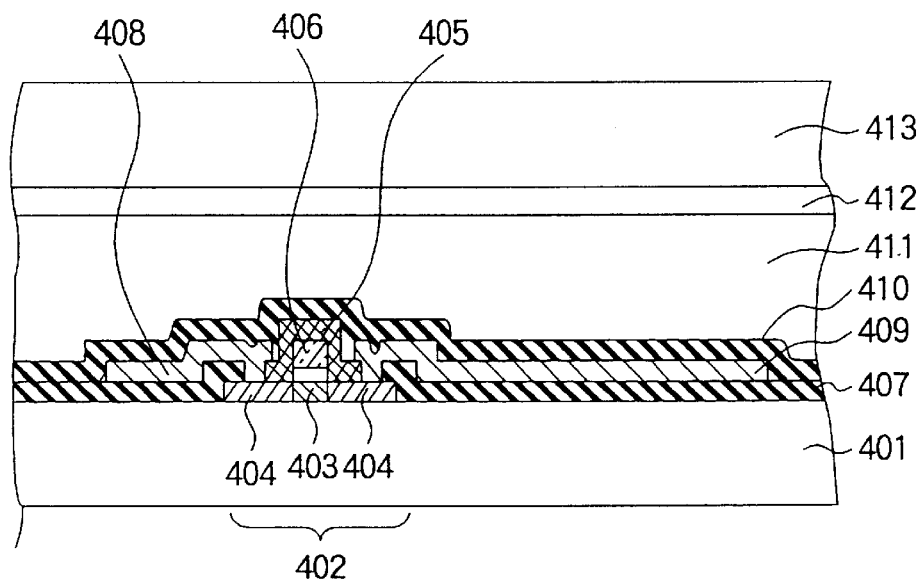
FIG. 22 is a sectional view of the pixel structure of FIG. 21.

FIG. 21 is a plane view showing an example of pixels actually formed based on the circuit shown in FIG. 19. FIG. 22 is a sectional view taken on line A–A' of FIG. 21. In FIG. 21, reference numeral 301 denotes a scan line, 302 a data line, 303 a transistor, and 304 a pixel electrode. A production process will be described with reference to FIG. 22.

First, a semiconductor layer 403 is formed on an insulating substrate 401 such as glass. After depositing an amorphous silicon film by a CVD method, a polycrystalline silicon film (thickness of 70 nm) crystallized by annealing with an excimer laser was used for the semiconductor layer.

By island patterning, a gate insulating film 405 was subjected to an ECRCVD method to deposit a silicon oxide film (thickness of 150 nm). Then, a gate electrode 406 was subjected to a sputtering method to deposit an Al alloy film to a thickness of 400 nm thereon, and a gate electrode pattern was formed by dry etching.

Then, by ion doping, ions formed of $PH_3$ plasma were implanted to an area of $2 \times 10^{16}/cm^2$ at 60 kV to form source and drain regions 404.

In this embodiment, the gate oxide film was partly or completely removed excepting the part below the gate electrode when the gate electrode was formed.

When a region with a low impurity concentration of about 2 μm was formed between the channel part 403 and the source or drain region 404 to make a so-called LDD structure, it was effective to decrease a leakage current. And, adoption of such a structure does not constitute any problem. Thus, a TFT portion 402 was formed.

Then, a layer insulation film 407 was formed of a silicon oxide film or silicon nitride film to deposit to a thickness of 500 nm by a CVD method. Through holes were formed in the source and drain regions and the gate line pad portion to form a data line 408 and a pixel electrode 409.

In this embodiment, the data line and the pixel electrode were formed of an Al alloy film, but the data line may be formed of metal, and the pixel electrode formed of a transparent electrical conductive film such as ITO. A ferroelectric film 410 was deposited thereon. For the ferroelectric substance, perovskite oxide, barium titanate ($BaTiO_3$) and PZT ($[Pb(Zr, Ti)O_3]$) were used in a thickness of 100 to 500 nm. As the material, a layered oxide (such as $Bi_4Ti_3O_{12}$) may be used, and an organic material (a mixture of vinylidene fluoride (VDF) and trifluoroethylene (TrFE)) may also be used. The film forming method may include a sputtering method, a sol-gel method, a laser abrasion method, and a CVD method.

A liquid crystal 411 was filled into an appropriate gap formed between the substrate having the TFT and the ferroelectric substance formed as described above and an opposed electrode 412 formed of glass or ITO onto an opposed substrate 413 formed of plastics or the like. The used liquid crystal was a guest host type. Liquid crystal having the host liquid crystal turned by 90 to 360 degrees or amorphous guest host type in which orientation is random is effective to enhance reflectance. And, a TN type may be used, and a selective reflection-transmission mode using a cholesteric liquid crystal, a ferroelectric liquid crystal, an antiferroelectric liquid crystal, a polymer-dispersed liquid crystal, or an OCB mode liquid crystal may also be used. A display method is also arbitrary, and may be any type to obtain transmission-absorption, transmission-dispersion, or dispersion-absorption in view of classification based on optical changes. Since the number of pixels is great, it is preferable to use a reflection type which has the pixel electrode formed by providing an insulator film on the element. But, a transmission type can also be used depending on the pixel size. The display can be monochrome or color. And, the liquid crystal layer may be a single layer or a multi layer.

The pixel electrode may have an uneven surface to diffuse light. And, an optical compensator which inverts the polarized light may be placed between the liquid crystal and the pixel electrode. Thus, guest host absorption is improved, and contrast is enhanced.

The optical compensator may be formed of the ferroelectric substance.

The ferroelectric substance may be provided partly. For example, it can be provided excepting the surface of the wiring.

One of the features of this embodiment of this invention is that no electrode is provided between the ferroelectric substance and the liquid crystal. Accordingly, an electric charge generated on the surface of the ferroelectric substance is locally neutralized by the leakage current of the liquid crystal, and the stable point of a potential is determined by self-alignment in the neighborhood or within the pixel electrode. Besides, even when the thickness of the ferroelectric layer varies spatially within the pixel or the composition is changed, such a change can be directed to the liquid crystal display, so that gradation can be displayed in space sharing even when a binary-display liquid crystal mode is used. In addition, to form a paraelectric layer on the ferroelectric layer having a variation in thickness so as to make a flat surface. And, by virtue of the ferroelectric substance, it is not necessary to make fine processing of the ferroelectric film and a yield is improved. The ferroelectric layer covers the transistor to prevent the exterior from being contaminated and to improve reliability.

The pixel electrode 409 may not be a fully covered form but a grid form. And, an in-plane mode may be used in which the opposed electrode 412 is not on the opposed substrate 413 but on a substrate with the switching matrix.

In the above description, the transistor was a polycrystalline silicon TFT, but may be an amorphous silicon TFT, single crystal silicon, or a silicon-germanium alloy. The transistor structure is not limited to the planer type but may be a staggered type or an inverted staggered type, and it is not limited to the self-alignment type but may be a non-self alignment type.

In addition, a electrode electrically coupled with the pixel electrode 409 can be employed which gives a relevant composition to have a capacitance connected to the node intervened between the liquid crystal layer 3 and the ferroelectric layer 2, in FIG. 19.

(Third embodiment)

Figure 23:
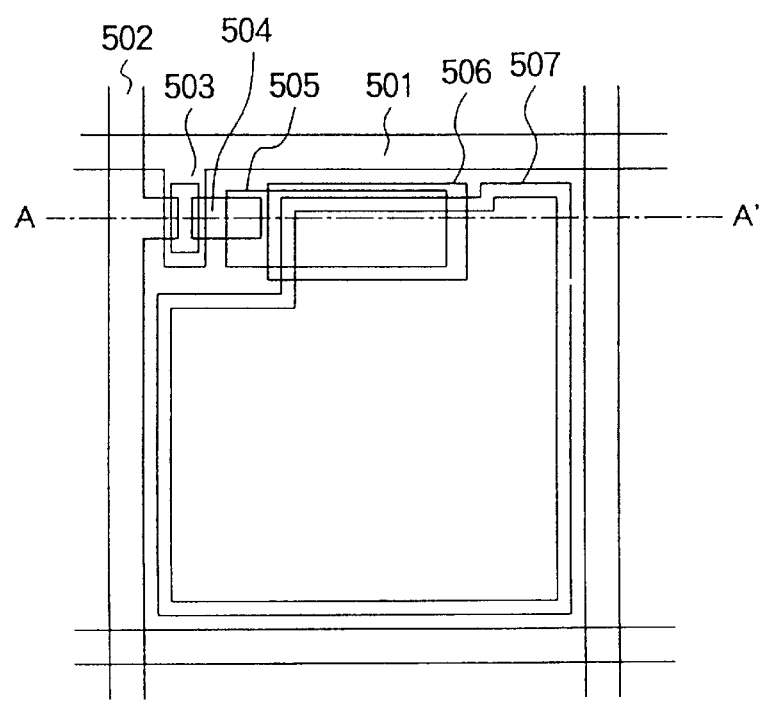
FIG. 23 is a plan view showing another example of the pixel structure of the liquid crystal display device of the invention.
Figure 24:
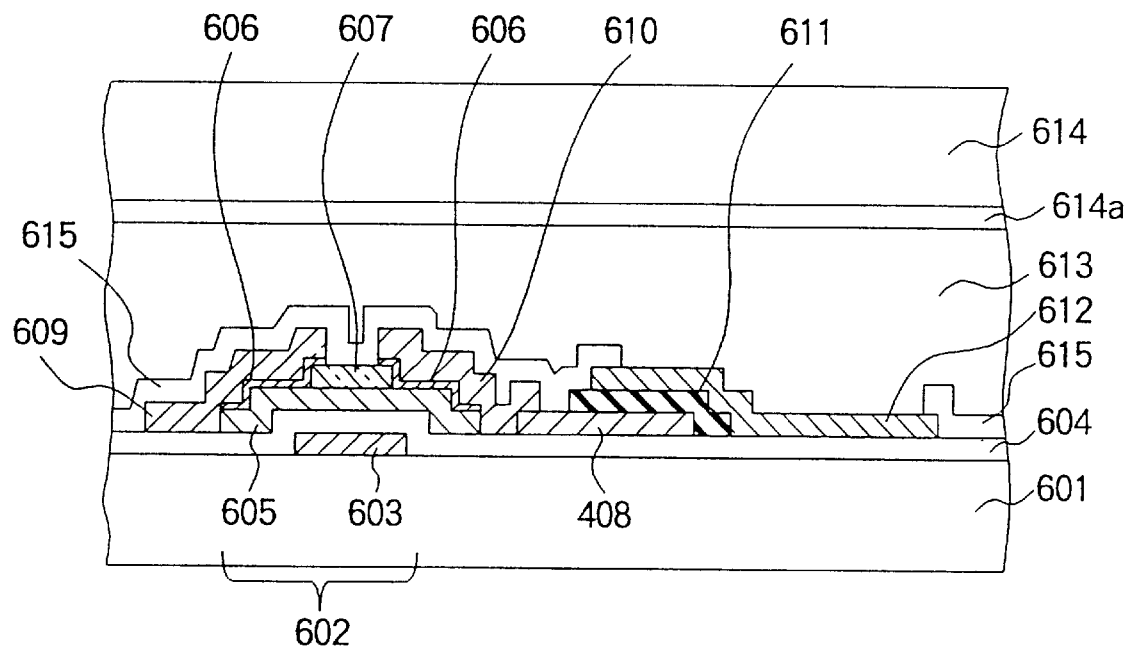
FIG. 24 is a sectional view of the pixel structure of FIG. 23.

FIG. 23 is a plan view showing the liquid crystal display device according to another embodiment. FIG. 24 is a sectional view taken on line A–A' of FIG. 23.

The liquid crystal display device shown in these drawings is quite different from the structure shown in FIG. 22 on the point that electrodes are provided with a ferroelectric body therebetween, and an electrode is also provided in contact with a liquid crystal. Besides, another difference is that the ferroelectric substance is only a part of the pixel.

In FIG. 23, reference numeral 501 denotes a scan line, 502 a data line, 503 a gate electrode, 504 a drain electrode, 505 a lower electrode, 506 a ferroelectric layer, and 507 a pixel electrode.

Details will be described mainly with reference to FIG. 24. A gate electrode 603 was formed on an insulating substrate such as glass, a gate insulator film 604, a semiconductor layer 605 and an upper insulator film 607 were deposited by a plasma CVD method, and the upper insulator film was patterned in self-alignment on the gate by double exposure consisting of back exposure and mask exposure. And, an n-type semiconductor layer 606 was deposited thereon, source and drain electrodes 609, 610 were formed thereon, and the n-type semiconductor layer was etched with the source and drain electrodes 609, 610 as the mask to form a TFT portion 602. The semiconductor layer 605 was amorphous silicon, and the n-type semiconductor layer was phosphorous-doped amorphous silicon or micro-crystalline silicon.

On the other hand, after depositing the gate insulator film, a lower electrode 608 with ferroelectric capacitance was formed, a ferroelectric layer 611 was deposited thereon, and patterning was performed. As the ferroelectric substance, the above-described various materials may be used.

Then, an electrode on the ferroelectric substance and a pixel electrode 612 were formed. And, the lower electrode 608 and the drain electrode 610 were contacted to electrically connect mutually.

Lastly, an insulator film 615 was deposited on the whole surface and removed from the pixel portion. The insulator film 615 can be a silicon nitride film, a light-absorbing organic insulator film (such as a pigment dispersion type acrylic resin), or the like. For the lower electrode 608 and the upper electrode 612, an indium-tin oxide film ITO was used. Thus, the ferroelectric substance allows the passage of light, and a transmission type display mode can be used. But, the electrode material may be platinum, gold or other materials. It is also possible that the electrodes are multilayered, the ferroelectric substance side is ITO, and the other side is molybdenum or aluminum. A liquid crystal 613, an opposed electrode 614a and an opposed substrate 614 may have the same structure as the one shown in FIG. 22.

A transistor used was an inverted staggered amorphous silicon TFT, but may be a polycrystalline silicon TFT and may have the structure of a planar type or staggered type.

By configuring as described above, there is an electrode for applying a voltage to the liquid crystal, so that the ferroelectric substance can be localized. Thus, designs for materials and a thickness of the ferroelectric substance become easy. And, since a voltage to the liquid crystal becomes uniform, images are made uniform when gradation is small or the like.

(Fourth embodiment)

Figure 25:
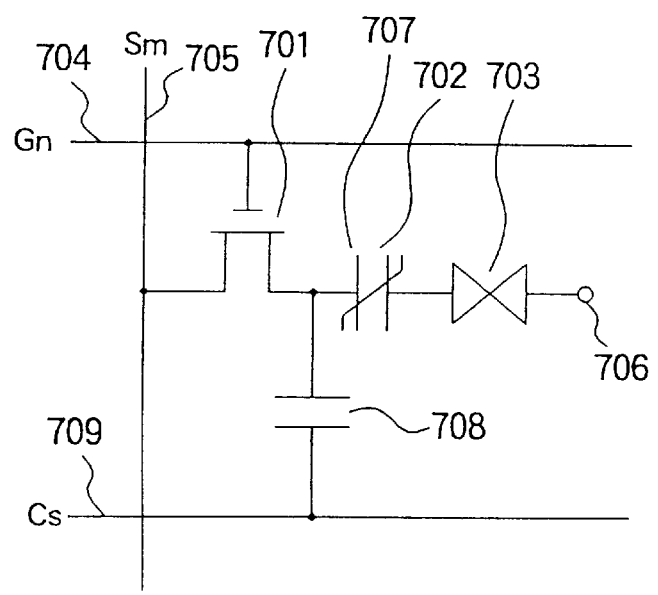
FIG. 25, FIG. 26 and FIG. 27 are diagrams showing other examples of the pixel circuit f the liquid crystal display device of the invention.

FIG. 25 is an equivalent circuit diagram of a single pixel of the liquid crystal display device according to another embodiment.

As shown in the drawing, a unit pixel comprises a transistor 701, an electrode 707 connected to the transistor, a ferroelectric capacitance 702, a liquid crystal 703, and an opposed electrode 706 which determines another potential of the liquid crystal. And, a potential of the electrode 707 is controlled through the transistor 701 which is connected to a scan line 704 and a data line 705. In this embodiment, a storage capacitance 708 is connected to a drain of the transistor 701 and to the electrode 707. Another electrode of the storage capacitance 708 is connected to a wiring 709. The wiring 709 is a dedicated wiring having a given potential, but may be the scan line of another pixel.

By configuring as described above, the storage capacitance 708 suppresses a change in potential of the electrode 707 while the transistor is off, so that it is not necessary to frequently fix a potential during the non-change holding time, and the external drive circuit and the drive system can be simplified. The insulator film forming the storage capacitance 708 may be a gate insulator film, a layer insulation film between the scan line and the data line, a ferroelectric film, a combine use type, or an exclusive use type.

(Fifth embodiment)

Figure 26:
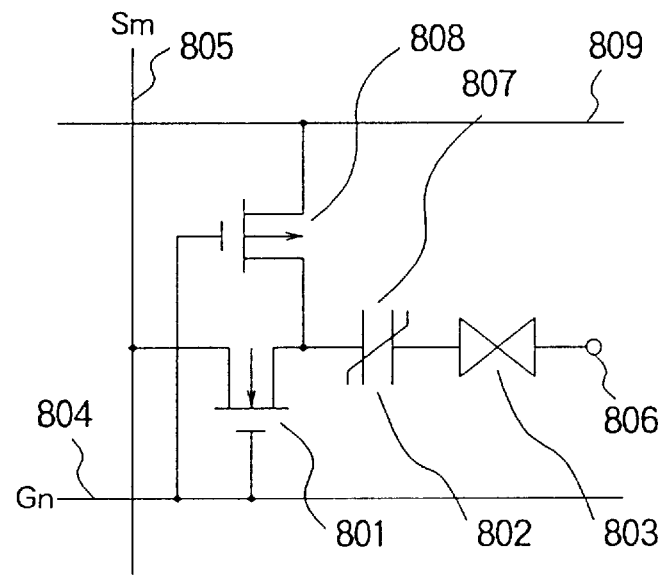

FIG. 26 is an equivalent circuit diagram of a single pixel of the liquid crystal display device according to another embodiment.

As shown in the drawing, a unit pixel comprises a transistor 801, an electrode 807 connected to the transistor, a ferroelectric capacitance 802, a liquid crystal 803, and an opposed electrode 806 which determines another potential of the liquid crystal. And, a potential of the electrode 807 is controlled through the transistor 801 which is connected to a scan line 804 and a data line 805. In addition, another transistor 808 is provided to operate so that the potential of the drain of the transistor 801 and the potential of the electrode 807 become equal to a predetermined potential, namely the potential of a wiring 809 in this embodiment, during at least a part of the non-selection time of the pixel.

In this embodiment, the transistor 801 for selecting a pixel is an n-channel type, and the other transistor 808 is a p-channel type, and their gates were connected to the same scan line 804. Accordingly, when the scan line is at a high level, the transistor 801 is turned on and the transistor 808 is turned off, the potential of the data line 805 is written into the electrode 807, and when it is at a low level, the transistor 801 is turned off and the transistor 808 is turned on, and the potential of the electrode 807 is fixed at the potential of the wiring 809. Thus, the need for operation during the non-change keeping time in FIG. 20A and FIG. 20B are eliminated completely, so that the memory state can be retained immediately after stopping the scan. Therefore, the external drive system can be simplified. In this embodiment, the pixel-selecting transistors are formed of the n-channel type and p-channel type transistors respectively, but they may be formed of the n-channel type transistor or the p-channel type transistor. And, the scan line 804 may be two, and an opposite-phase scan signal may be applied to each of them. Another circuit may be used if the potential of the electrode 807 is fixed by a separate circuit excepting when the signal of the data line 805 is applied to the electrode 807.

In addition, a reset signal such as $V_R$ shown in FIG. 20A can also be applied by the wiring 809. To do this, for example, to apply the reset voltage $V_R$ via transistor 808 before the pulse which turns on the transistor 801 is applied on the scan line 804. In such cases, a driving circuit drives wiring 809 can be formed as a digital circuit since the reset signal is generated by a certain constant potential while the data signal generated by various level of potentials. Thus the structural complexity of the driver circuit is reduced, and the pulse with higher voltage is applied.

(Sixth embodiment)

Figure 27:
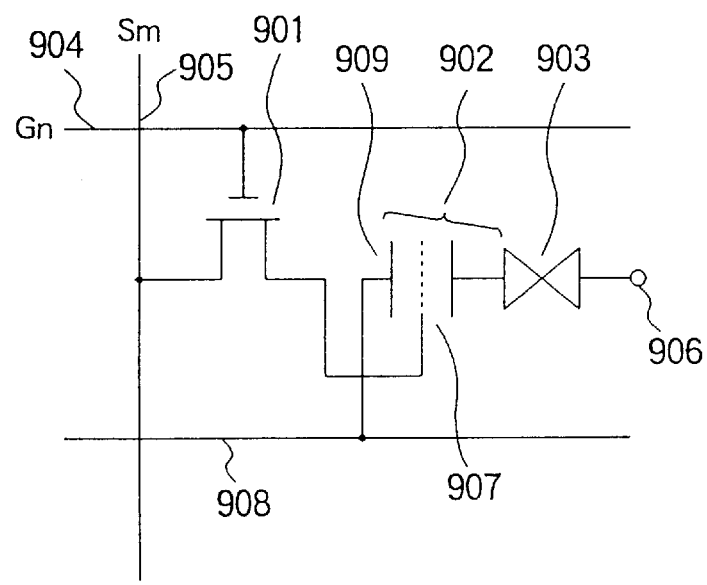

FIG. 27 is a schematic circuit diagram of a single pixel of the liquid crystal display device according to still another embodiment.

The device shown in this drawing has a scan line 904 for selecting a transistor 901 and a data line 905 for supplying a signal; and it is characterized to apply a potential to an electrode 907 within an element 902 containing a ferroelectric substance in order to apply a voltage to a liquid crystal 903. The element 902 has the ferroelectric substance between a lower electrode 909 and the electrode 907 to control a polarization of the ferroelectric substance with a voltage applied to the electrode 907, and an electric field produced by the electric charge generated around the electrode 907 is applied to the liquid crystal.

Figure 28:
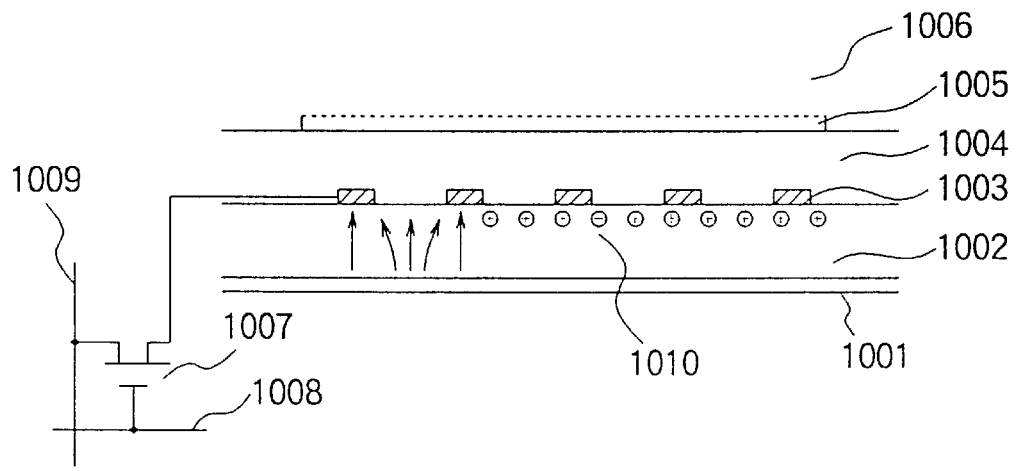
FIG. 28 is a schematic diagram partly showing the pixel structure of FIG. 27.

FIG. 28 is a diagram showing a more specific structure.

As shown in the drawing, a second electrode 1001 is formed below a ferroelectric layer 1002, and a first electrode 1003 on the ferroelectric layer. An insulator layer 1004 is formed on the first electrode 1003, and an electric field is applied to a liquid crystal 1006 through the insulator layer 1004.

The first electrode 1003 is patterned into a predetermined form. Here, a plurality of slits are formed in the first electrode 1003, and the ferroelectric layer 1002 is partly faced with the liquid crystal layer. Therefore, a voltage needed to control the polarized state of the ferroelectric layer 1002 can be lowered. The pattern is not limited to the slits, but may be a mesh or grid.

On the first electrode patterned, an insulator layer such as a passivation film or an orientation film may be formed. Besides, a third electrode (e.g., a reflective electrode 1005) may be formed on such an insulator film. In this case, the first electrode is also electrically coupled with the third electrode, and the polarized component of a paraelectric capacitor interacts with the liquid crystal layer.

As described above, the invention covers a structure in that the first electrode 1003 or the second electrode 1001 is formed of a plurality of parts having a different potential.

Provision of the pixel electrode 1005 as the third electrode on the insulator layer 1004 is effective to suppress the luminance within the pixel from varying. This third electrode may be omitted, and then, it is effective to obtain the luminance change flatly within the pixel.

A transistor 1007 is connected to the first electrode 1003 to supply a signal for the pixel. When a potential is given to the first electrode 1003, an electric field is generated within the ferroelectric layer 1002 toward the first electrode as indicated by lines of electric force shown on the left in the drawing, and a spontaneous polarization is aligned with its direction. In the neighborhood of the first electrode 1003, a polarization is aligned substantially in the same direction though the direction of the electric field is slightly bent. And, in the neighborhood of the first electrode 1003, namely a part of the ferroelectric layer 1002 where the first electrode 1003 is not formed, a fixed charge 1010 is generated owing to the polarization. The electric field produced by this electric charge is applied to the liquid crystal 1006 through the insulator layer 1004.

The insulator layer 1004 can be a high dielectric film formed of a metal oxide in addition to the silicon oxide film or silicon nitride film. And, it can also be a ferroelectric film. In such a case, its material is desired to have a high electric field different from the ferroelectric film 1002.

By configuring as described above, the polarized state of the ferroelectric substance can be controlled directly without through the medium of the liquid crystal. Therefore, the need for applying a voltage to the first electrode 1003 with the capacitance change of the liquid crystal taken into account can be eliminated, the voltage can be controlled more accurately, and gradation can be generated in greater number.

When the above-described insulator layer 1004 is formed of a ferroelectric substance, the same effects as described in the beginning can be obtained. Specifically, by raising a dielectric constant of the insulator layer 1004, the liquid crystal 1006 is greatly influenced by the fixed charge 1010, and the polarization can be retained between the first electrode 1003 and the liquid crystal layer 1006, thereby enabling to drive the liquid crystal. Thus, the liquid crystal can be driven on the first electrode 1003 patterned, and an aperture ratio can be improved.

Furthermore, the lower electrode, the second electrode 1001, is not restricted to the one which is fully faced with the first electrode 1003 as shown in FIG. 28. The second electrode can also be patterned in the form of a mesh and can be used to control the lines of electric force formed between the first electrode 1003 and the second electrode 1001. For example, the lines of electric force in a slant direction are positively used to control a polarization vector, and a vertical component strength can be changed spatially by the applied voltage. In this case, the insulator film 1004 may be either a ferroelectric substance or not. Thus, an area gradational effect can be given.

Besides, by patterning the first electrode 1003 and the second electrode 1001 to form an electric field having a different direction in the ferroelectric layer, the polarization control can be given variations. The second electrode 1001 can also be designed not to be restricted to a predetermined potential. Otherwise, the second electrode 1001 may be varied into numerous forms.

It is to be understood that the above modifications can also be applied to the embodiments to be described afterward.

(Seventh embodiment)

Figure 29:
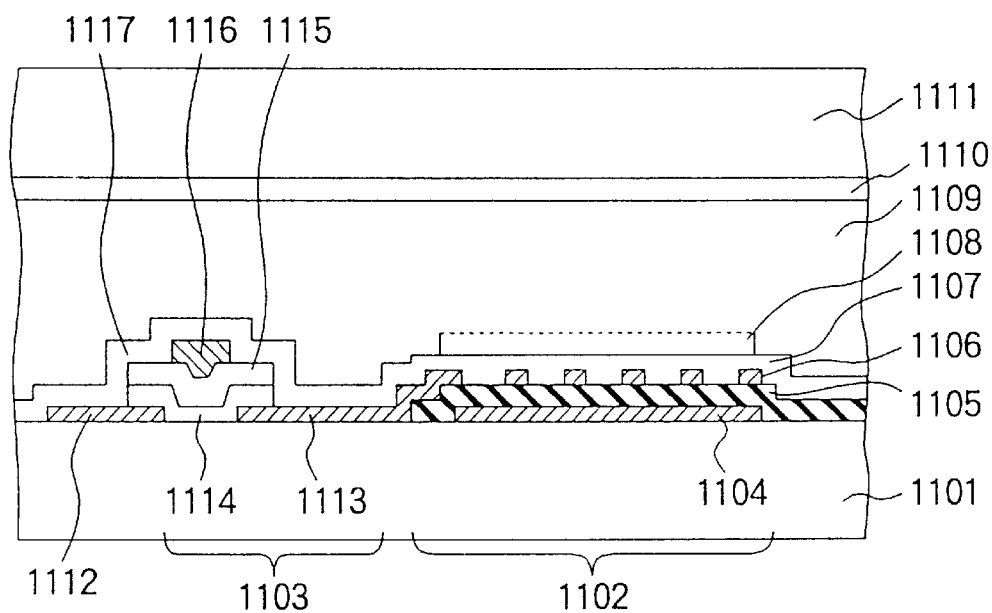
FIG. 29, FIG. 30 are sectional views showing other examples of the pixel structure of the fluid crystal display device of the invention.

FIG. 29 is a sectional view showing the same one of FIG. 27 and FIG. 28 excepting that the transistor was changed to a top gate staggered type.

In the drawing, reference numeral 1101 denotes an insulating substrate. The insulating substrate 1101 has a transistor 1103 and an element 1102 containing a ferroelectric substance. Reference numeral 1111 is an opposed substrate which has an opposed electrode 1110. A liquid crystal 1109 is intervened between the insulating substrate 1101 and the opposed substrate 1111. The transistor 1103 comprises a semiconductor layer 1114, source and drain electrodes 1112, 1113, a gate insulator film 1115, and a gate electrode 1116. The element 1102 including the ferroelectric substance has a lower electrode 1104, a ferroelectric layer 1105, and an upper electrode 1106. Reference numeral 1107 denotes an insulator film, and 1108 a pixel electrode.

(Eighth embodiment)

Figure 30:
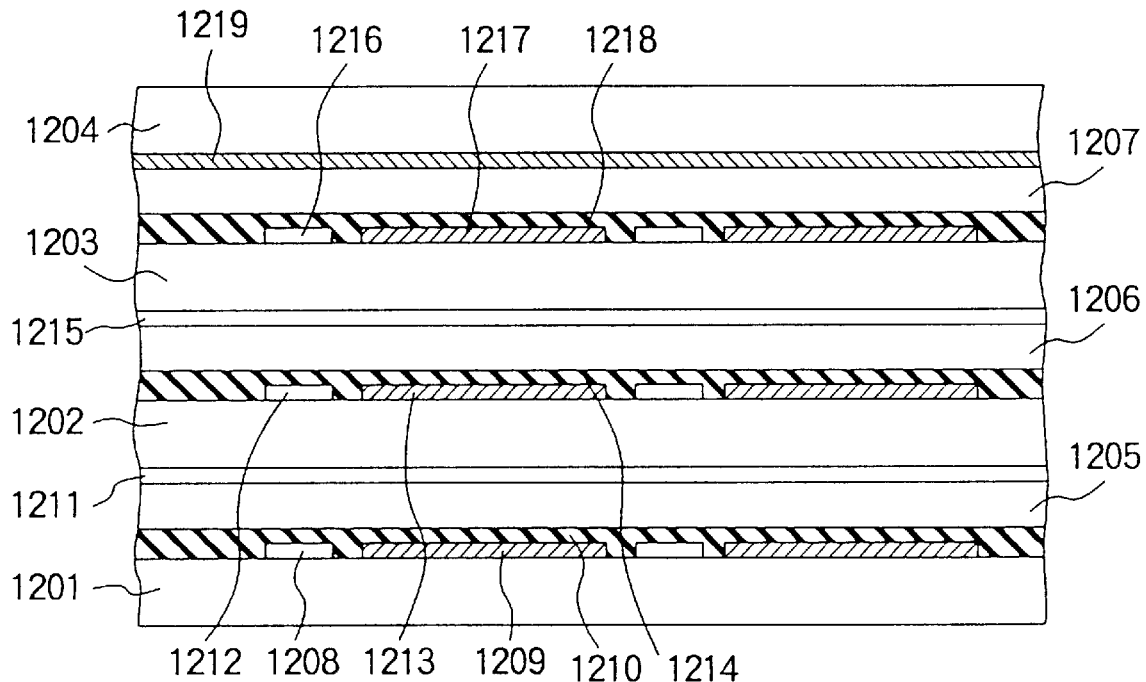

FIG. 30 is a sectional view showing another example.

The one shown in this drawing has three liquid crystal layers and three TFT substrates with the switching matrix. On the bottom layer which is an insulating substrate 1201, a TFT 1208, an electrode 1209 and a ferroelectric layer 1210 are formed, and a first liquid crystal layer 1205 is formed between the insulating substrate 1201 and an opposed electrode 1211 which is provided below a second substrate 1202. The second substrate 1202 is a transparent insulating substrate on which a TFT 1212, an electrode 1213 and a ferroelectric layer 1214 are formed. In addition, a second liquid crystal layer 1206 is provided between the ferroelectric layer 1214 and an opposed electrode 1215 provided below a third substrate 1203. The third substrate 1203 has the same structure as the second substrate 1202 does and has a TFT 1216, an electrode 1217 and a ferroelectric layer 1218 thereon. And, a third liquid crystal layer 1207 is formed between the ferroelectric layer 1218 and an opposed substrate 1219 provided below an opposed substrate 1204.

The liquid crystal layer is a guest host type and its three layers are designed to absorb cyanogen, Magenta and yellow, so that color display can be made by subtractive color mixing.

In FIG. 30, reflective color display is obtained by entering light from above into and returning from the three-layered liquid crystal layer which includes the electrode 1209 used as a reflective electrode and the other electrodes as a transparent electrode.

Since the respective TFT layers have a memory, it is not necessary to supply data during the image is not renewed as described above, enabling to achieve a low power consumption.

In this embodiment, each TFT array is configured similar to the structure shown in FIG. 22, but may be configured differently. In addition, it is also possible to enter light from below and to reflect on the side of the substrate 1204 in FIG. 30. Besides, the electrode 1209 can also be a transparent electrode to provide a so-called transmissive type so that light is entered from one side of the substrate and images are seen from the other side. The liquid crystal layer is a guest host type but can have a selective reflection mode using a cholesteric liquid crystal.

Since the number of elements is not many and the aperture ratio is high in this invention, the transmission type (the intermediate substrate is a transmission type) array can be formed in this embodiment.

(Ninth embodiment)

Figure 31:
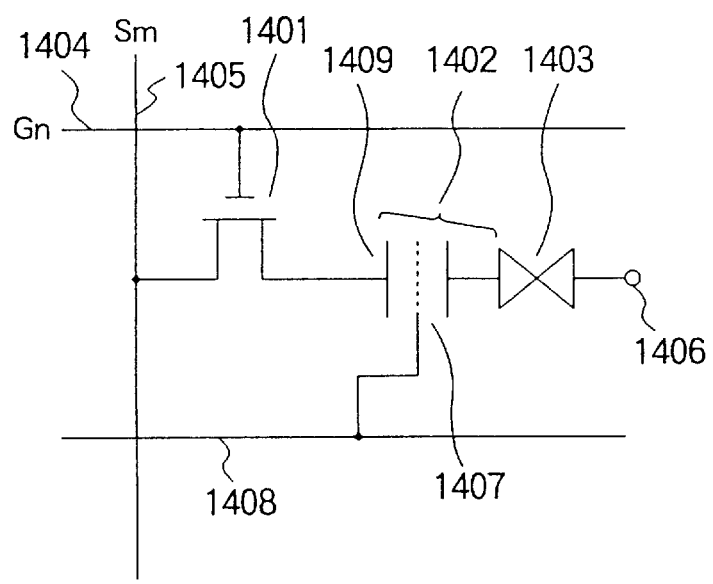
FIG. 31, FIG. 32, FIG. 33, FIG. 34, FIG. 35 and FIG. 36 are diagrams showing other examples of the circuit structure of the pixel of the liquid crystal display device of the invention.

FIG. 31 is a modification from the one shown in FIG. 27. The apparatus shown in FIG. 31 has a scan line 1404 for selecting a transistor 1401, and a data line 1405 for supplying a signal; to apply a voltage to a liquid crystal 1403, a potential is applied to an electrode 1407 within an element 1402 containing a ferroelectric substance. The element 1402 has the ferroelectric substance between a lower electrode 1409 and the electrode 1407. And, differences from the one shown in FIG. 27 are that a drain of the transistor 1401 is connected to the lower electrode 1409, and the electrode 1407 is connected to its neighboring scan line 1408.

Figure 32:
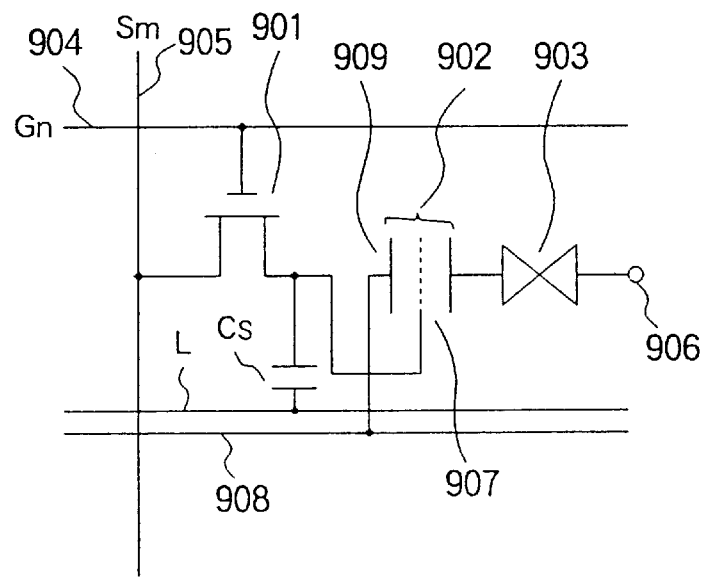
Figure 33:
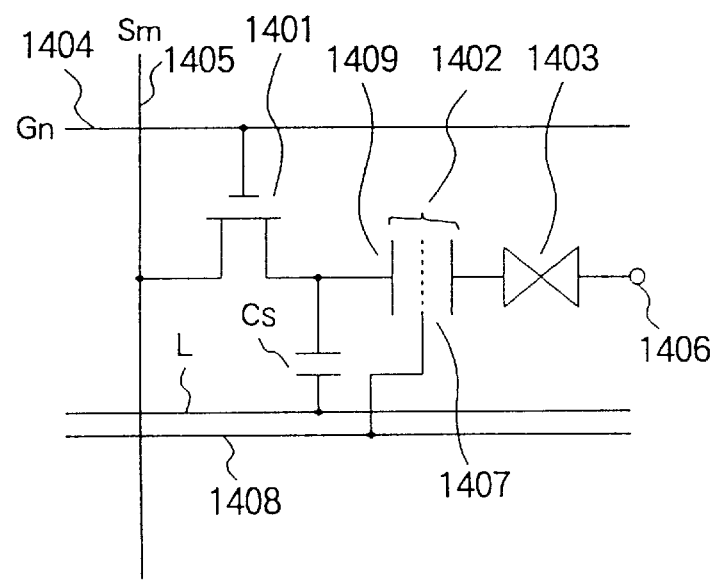

In FIG. 27 or FIG. 31, a storage capacitance Cs connected to a storage capacitance line L may be provided. FIG. 32 and FIG. 33 show such examples.

Figure 34:
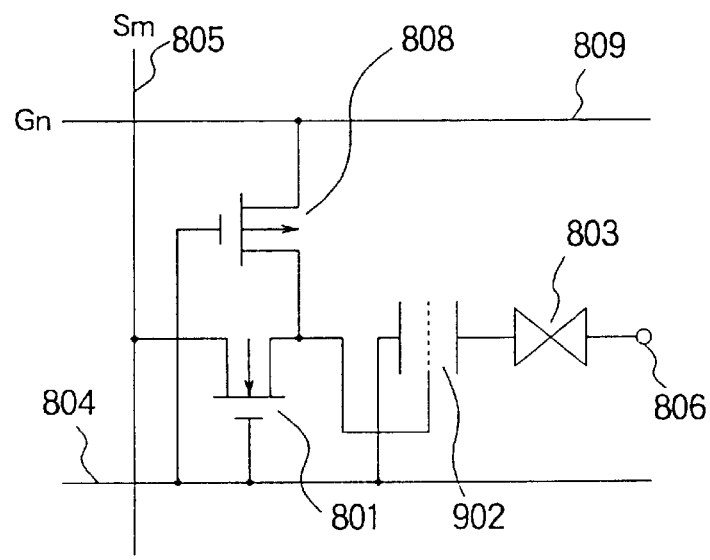
Figure 35:
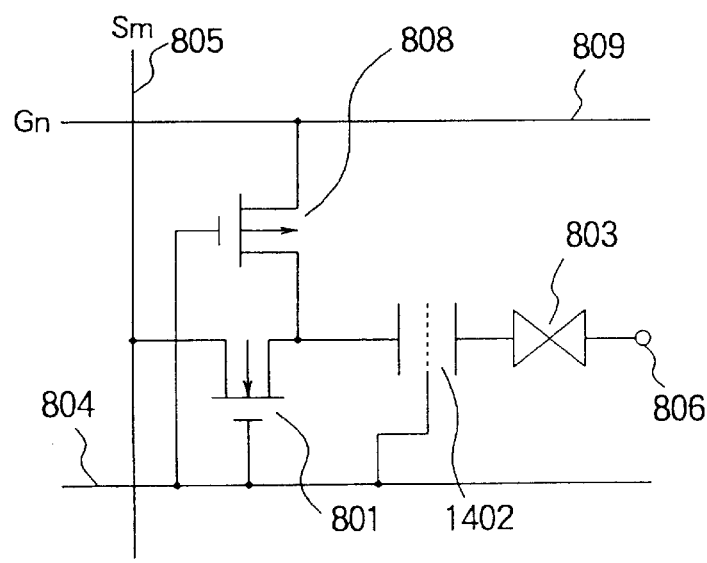

And, the ferroelectric capacitance in the structure shown in FIG. 26 may be replaced with the element 902 or 1402 which has the ferroelectric element intervened between the lower electrode and the electrode shown in FIG. 27 or FIG. 31. Such a structure is shown in FIG. 34 and FIG. 35.

The structure of the transistor though the above-described embodiments can be modified in various ways, and the variations described in the first embodiment can be applied to the other embodiments in the same way. And, the selecting transistor was single in such embodiments, but the circuit having two or more transistors may be used (e.g., an AND logic circuit with two transistors that a signal can be written into the pixel only after the signals from two scan lines wired lengthwise and crosswise become a high level). Besides, an MFS type TFT having a ferroelectric substance for the gate insulator film of the transistor can also be used.

Other modifications can also be made without departing from the spirit and the scope of the invention.

As described above, the present invention can reduce the power consumption of a liquid crystal display. The liquid crystal can provide gradation thought it has memory, so that an amount of information on the screen can be increased, and good image quality can be obtained.

(Tenth embodiment)

Figure 1:
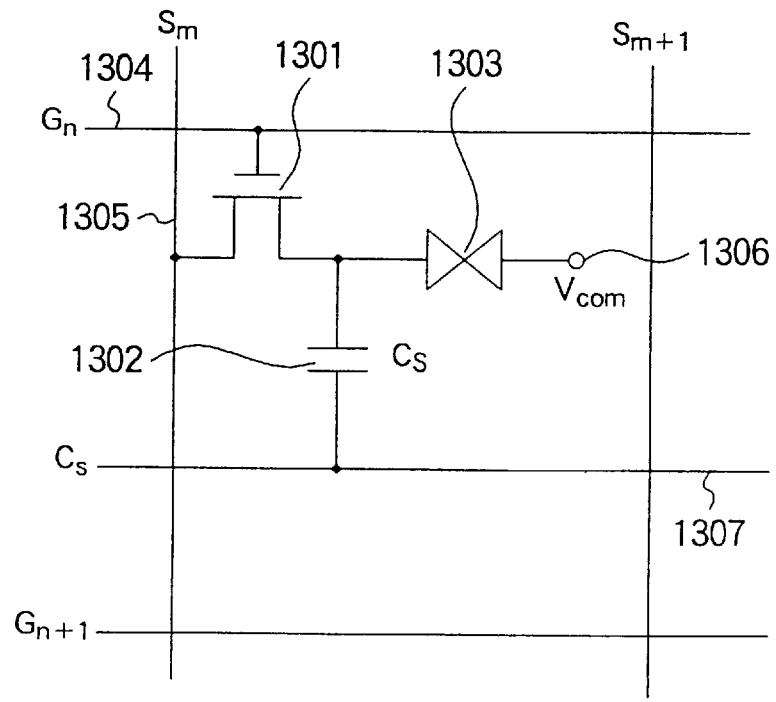
FIG. 1 is a pixel circuit of a conventional liquid crystal display device.
Figure 2A:
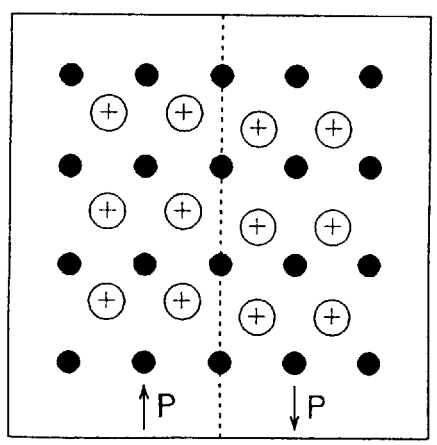
FIG. 2A and FIG. 2B are schematic diagram showing a polarization of a ferroelectric substance.
Figure 2B:
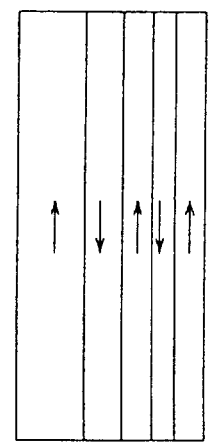
Figure 3:
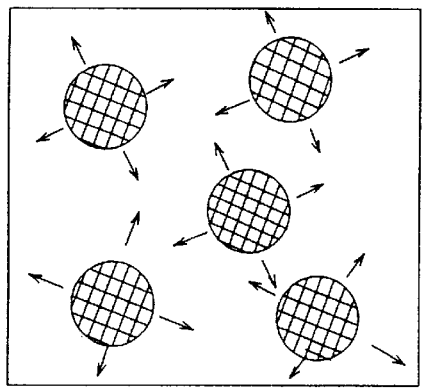
FIG. 3, FIG. 4 are schematic diagrams showing displayed states of pixels by the distribution of domains of the ferroelectric film.
Figure 4:
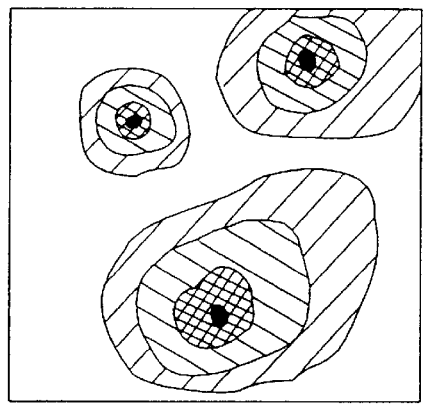
Figure 5:
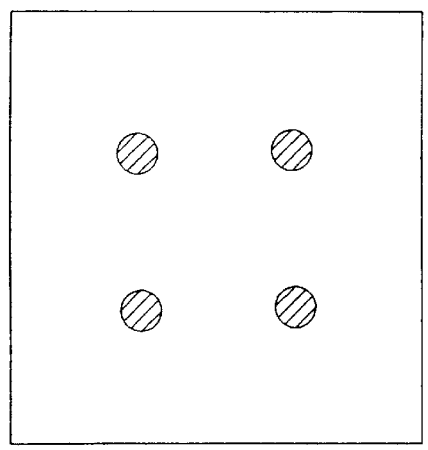
FIG. 5, FIG. 6, and FIG. 7 are schematic diagrams showing the changing staff domain distribution in the pixel.
Figure 6:
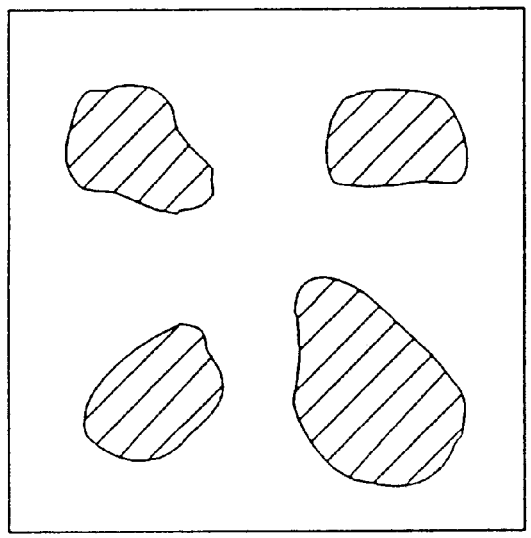
Figure 7:
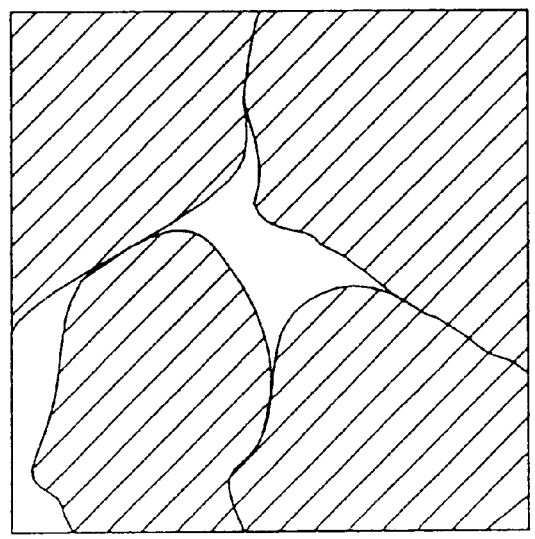
Figure 8:
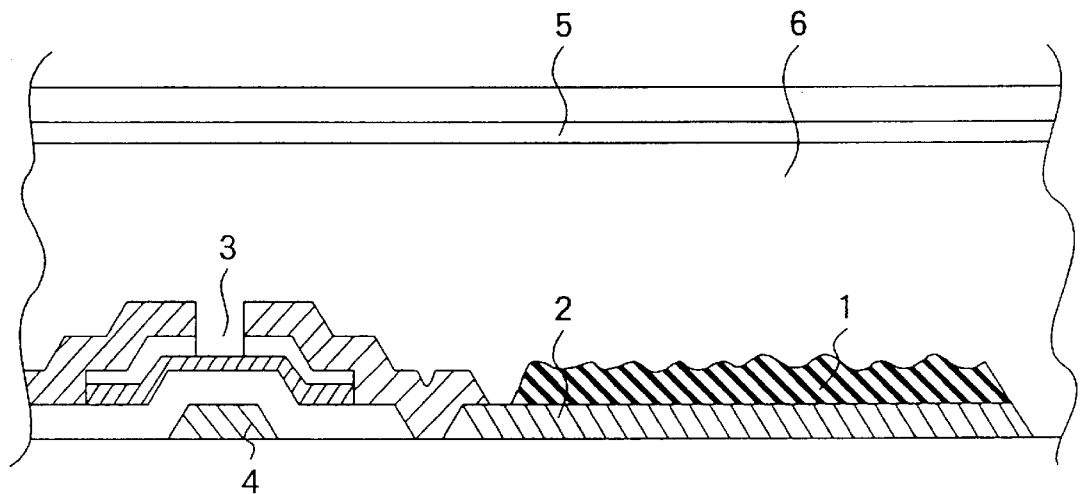
FIG. 8 is a schematic diagram showing a liquid crystal display device of the invention.
Figure 9:
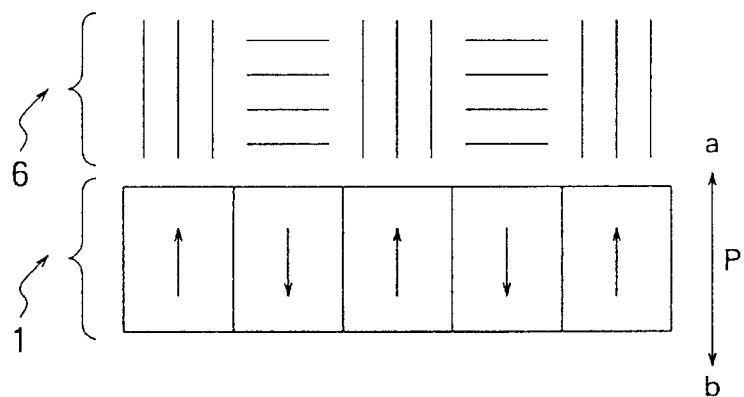
FIG. 9 is a schematic diagram showing the domain structure of a ferroelectric substance and an oriented state of a liquid crystal.
Figure 10:
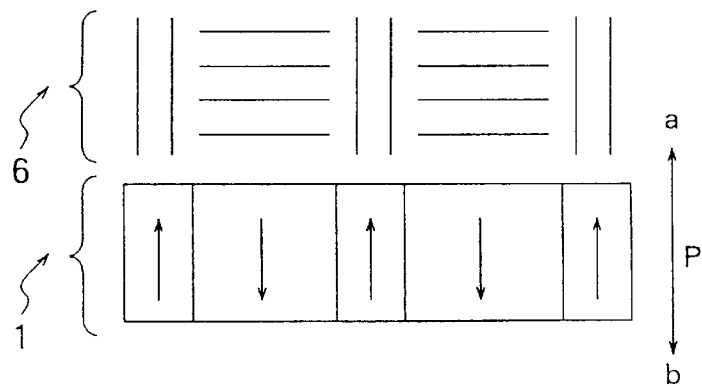
FIG. 10 is a schematic diagram of the domain structure of a ferroelectric substance and an oriented state of a liquid crystal when an electric field is applied to the ferroelectric substance.
Figure 11:
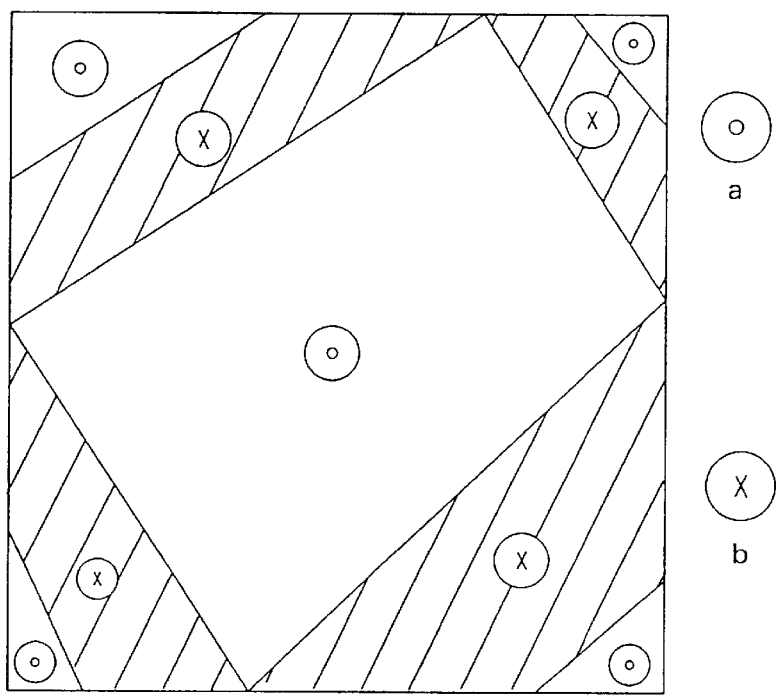
FIG. 11 is a schematic diagram of the domain structure in the pixel region in the state shown in FIG. 10.
Figure 12:
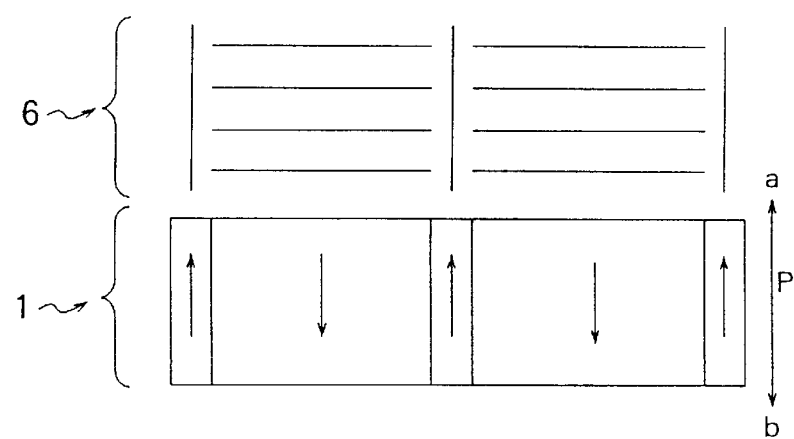
FIG. 12 is a schematic diagram showing the domain structure of a ferroelectric substance and an oriented state of a liquid crystal when a voltage is applied.
Figure 13:
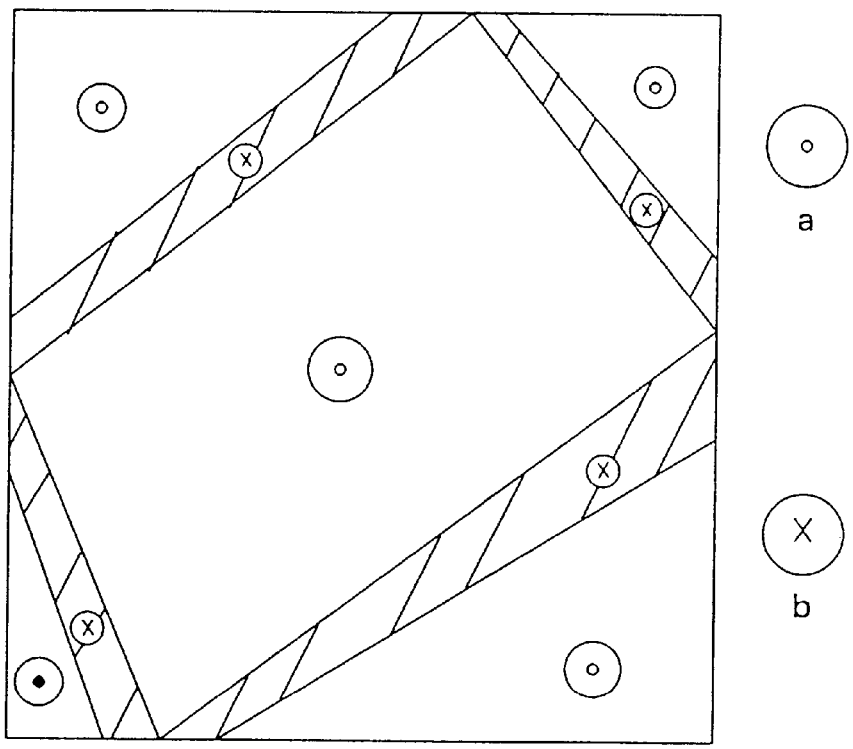
FIG. 13 is a schematic diagram showing the domain distribution in a pixel region in the state shown in FIG. 12.
Figure 14:
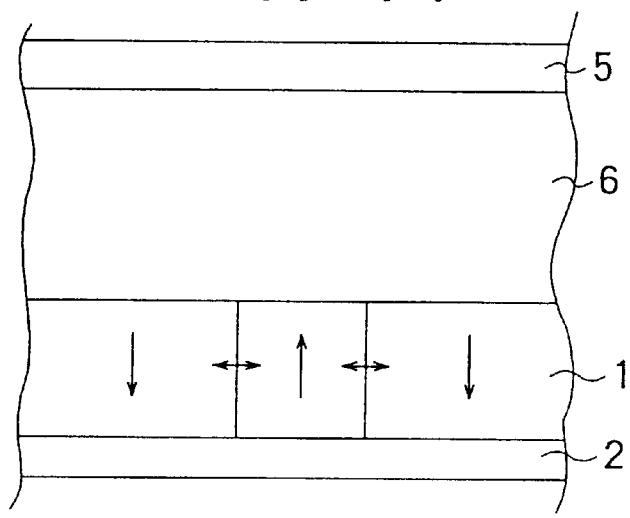
FIG. 14 is a schematic diagram showing a state that a pixel is divided corresponding to the domain structure (a monocrystal)
Figure 15A:
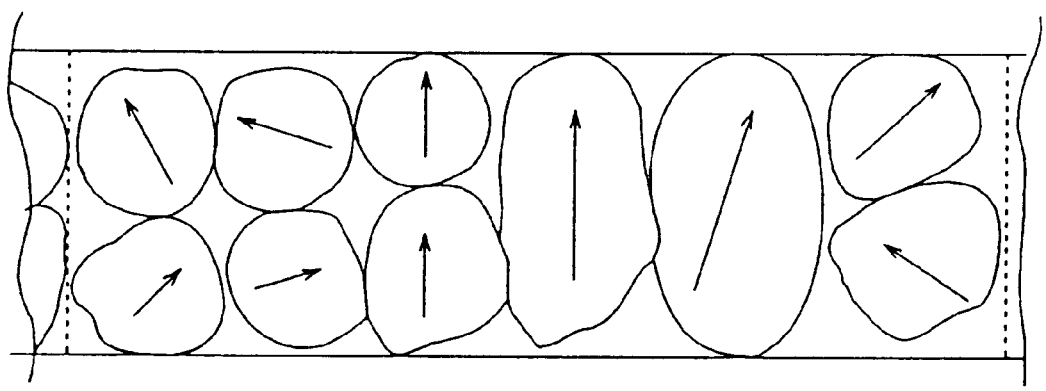
FIG. 15A and FIG. 15B are schematic diagrams showing the domain distribution in an aggregate of crystallites.
Figure 15B:
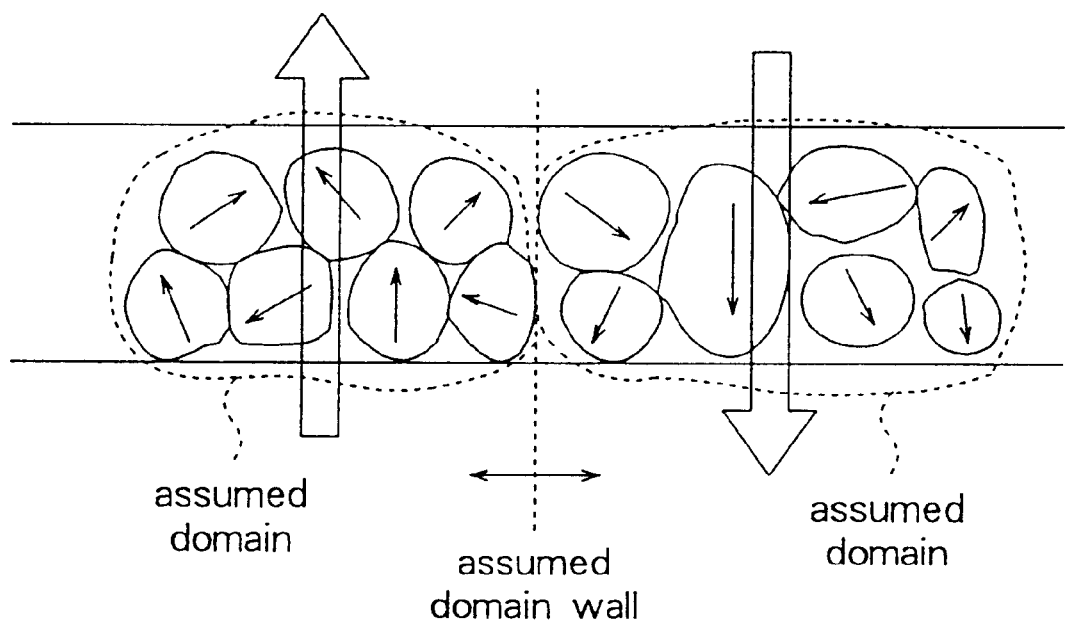
Figure 16A:
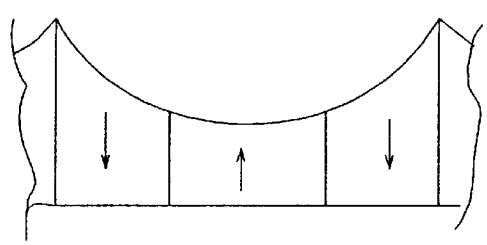
FIG. 16A and FIG. 16B are schematic diagrams showing the structure of a ferroelectric thin film for the domain division of a ferroelectric substance in a pixel region.
Figure 16B:
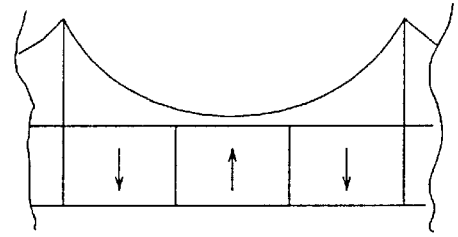
Figure 17A:
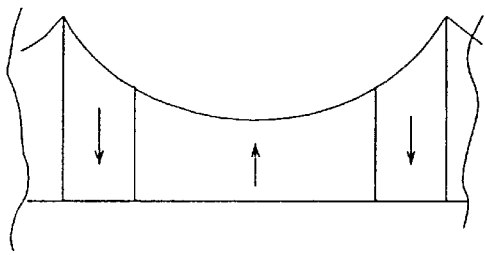
FIG. 17A and FIG. 17B are schematic diagrams showing a change in domain distribution when a voltage is applied to the ferroelectric thin film of FIG. 16A and FIG. 16B.
Figure 17B:
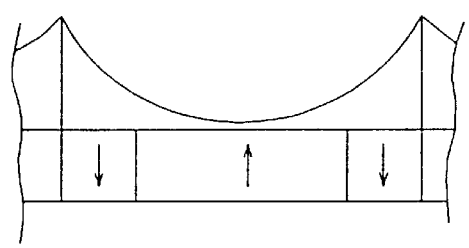
Figure 18:
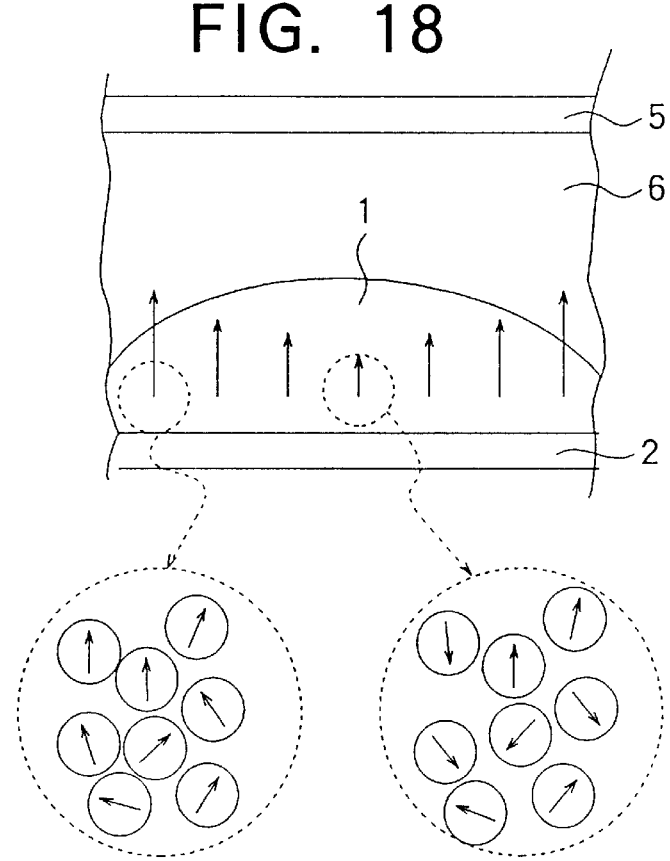
FIG. 18 is a schematic diagram showing a state that a pixel is divided corresponding to the domain structure (a polycrystal)
Figure 36:
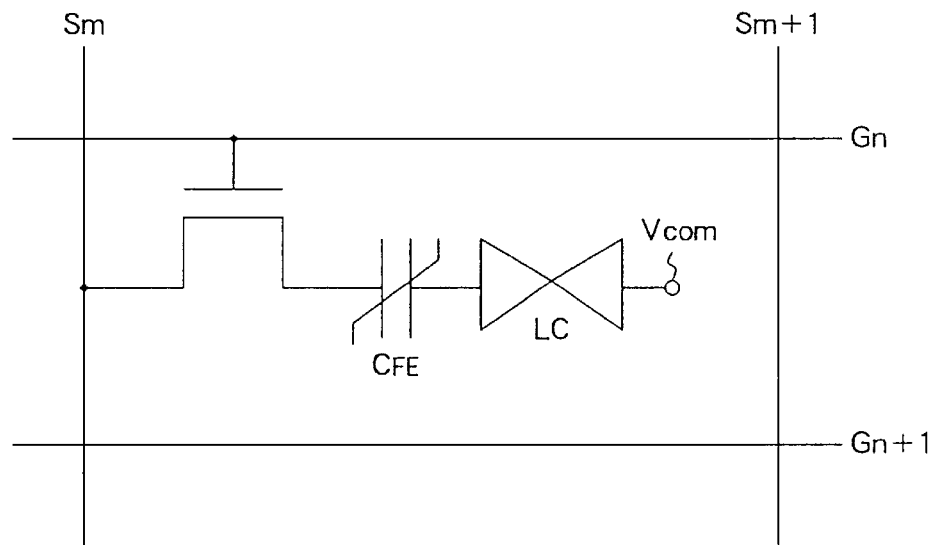

A liquid crystal display device provided with the ferroelectric thin film exemplified in FIG. 8 was produced to check the gradation display operation. Specifically, a boundary between a first domain and a second domain having a different polarization of the ferroelectric thin film was shifted to form pixel domains. And, the orientation state of liquid crystal was controlled for each pixel domain. FIG. 36 is a diagram showing one example of the circuit structure of a pixel for this liquid crystal display device.

In this embodiment, the ferroelectric film was formed by subjecting a monocrystal ferroelectric film to a homoepitaxial growth.

To use the domain control of the ferroelectric monocrystal thin film of the invention, the ferroelectric monocrystal thin film is desired to have its polarization axes aligned in the vertical direction of a substrate, and not to have a grain boundary which disturbs the domains from being minimized or not to have many transpositions or defective lattices.

Domains can be formed to have a size enough for the liquid crystal to respond.

The domains of ferroelectric monocrystals have their size and shape heavily depend on not only a method for forming the ferroelectric monocrystal thin film, but also the properties of a base material for forming the ferroelectric monocrystal thin film.

For example, a base material having a state similar to the homoepitaxially grown state may be selected. The ferroelectric thin film is preferably stacked on a monocrystal substrate which is conductive and can stand high temperature hysteresis.

(Eleventh embodiment)

Figure 37:
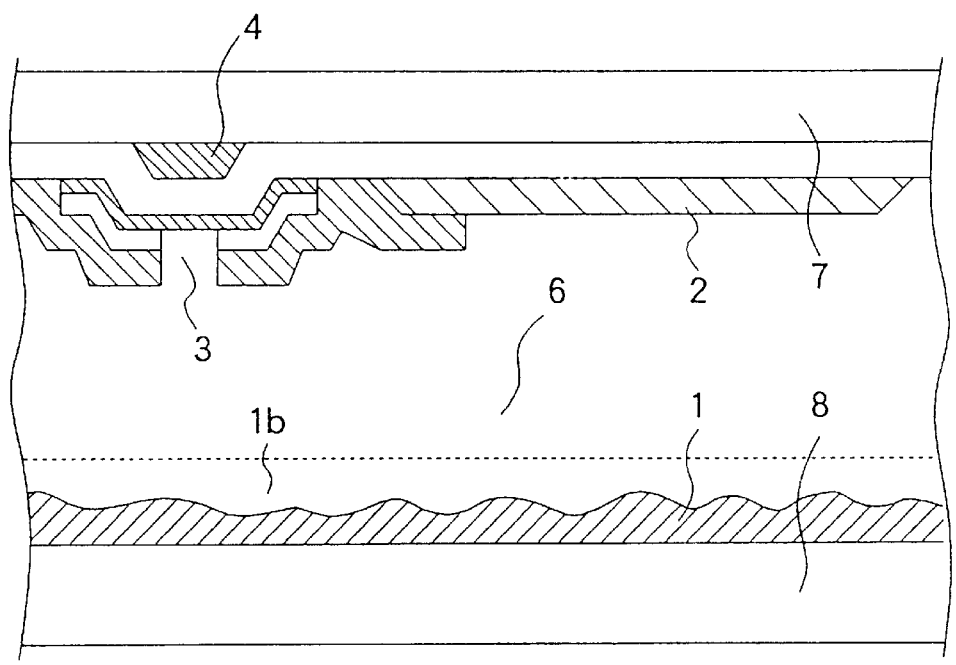
FIG. 37, FIG. 38 and FIG. 39 are schematic diagrams showing the structure of the liquid crystal display device of the invention.

FIG. 37 shows a liquid crystal display device which has a substrate with the switching matrix containing a non-linear switching element on the top. In the liquid crystal display device shown in FIG. 37, an inverted staggered type thin film transistor was used as the non-linear switching element, but this switching element is not exclusive. Other three-terminal and two-terminal non-linear switching elements can also be used.

And, the substrate of the invention can also be applied to a liquid crystal display device having a simple matrix structure.

In the structure of the liquid crystal display device exemplified in FIG. 37, as a base material for the ferroelectric monocrystal thin film, a metal or a compound having a metallic gloss (composite oxides such as tungsten bronze) may be used as a reflector.

To form a ferroelectric monocrystal thin film having a good crystal state, a high temperature process is required because a migration length due to the thermal activity of a cluster must be increased, but it is sufficient for this structure by securing a heat resistance of the monocrystal substrate which also serves to provide the functions of an opposite electrode.

And, the ferroelectric monocrystal thin film of the liquid crystal display device of the invention may be formed on each pixel electrode. In this case, the pixel electrode is formed on an insulation monocrystal substrate, and the ferroelectric monocrystal thin film may be formed thereon. Furthermore, in forming the ferroelectric monocrystal thin film on the pixel electrode, the ferroelectric thin film is required to be etched, resulting in the increase of the number of processes.

When a transmissive semiconductor monocrystal substrate such as $SrTiO_3$ which has Nb doped is used as a substrate of the ferroelectric monocrystal thin film, it can also be adopted for a transmissive liquid crystal display device.

And, as a result of testing various sizes of monocrystal base materials for the ferroelectric monocrystal thin film, it was found that a base material formed by tiling a conductive monocrystal base material on, for example, quartz glass can also be used. It is preferable that the tiled monocrystal base material has its face joined to portions where the pixels of the liquid crystal display device are not formed.

A conductive buffer layer may be formed on the monocrystal base material regardless of whether it is conductive or dielectric in such a way that the homoepitaxial growth of the ferroelectric monocrystal thin film is not prevented. And, in a case of using a monocrystal base material having lattice constants which do not match completely, a lattice constant converting function can be provided. Since the ferroelectric monocrystal thin film is subjected to the epitaxial growth, an inorganic compound such as $LiNbO_3$ or PZT may be used.

Since a monocrystal thin film is desirable, to form a ferroelectric thin film, vapor phase epitaxy such as an MBE method or a CVD method may be used. In this embodiment, an MOCVD method using an organic metal complex as a material was used to form the ferroelectric thin film.

The ferroelectric monocrystal thin film is not limited to an inorganic compound but may be formed of an organic thin film of polyvinylidene fluoride which does not have a grain boundary detrimental to the domain growth and has undergone an orientation treatment.

And, the ferroelectric liquid crystal may be used not for an optical valve or an optical switch but for the domain growth.

As to the liquid crystal materials, various types may be used regardless of their threshold property. For example, when a TN liquid crystal is used, halftone can be displayed without using an instable intermediate state that the display is deteriorated due to a voltage drop.

And, a polarization of the ferroelectric substance has memory, the polarized state can be held even when a voltage is not being applied, and the liquid crystal can be held in a non-volatile state even when the application of a voltage is stopped.

The invention is also effective for a liquid crystal display device which uses a liquid crystal layer having low insulation properties such as a guest host liquid crystal. In this case, gradation display can be achieved by only a binary state as an optical switch without requiring an instable intermediate state. Besides, display is not deteriorated because the ferroelectric substance keeps a voltage even when a charged object such as ions are shifted.

Besides, the invention is particularly effective for a liquid crystal display device which has its liquid crystal layer formed of a ferroelectric liquid crystal or an antiferroelectric liquid crystal.

As a method of displaying in a halftone state by the domains of the ferroelectric or antiferroelectric liquid crystal, a multi-domain is available. The ferroelectric thin film can be provided with a domain forming action, and the liquid crystal layer can form a domain accordingly.

The liquid crystal display device of the invention can make halftone display in an analog fashion with a binary liquid crystal, and its mechanism is as follows.

When a voltage for providing halftone is applied to a pixel electrode, the ferroelectric thin film does not make the remanence in a halftone state, but a volume (domain) ratio with the polarization directions in opposite directions one another is varied to store electric charges.

At this time, in accordance with the area ratio of domains having a different polarization in the pixel region, a voltage is applied to the liquid crystal depending on each polarization direction. Thus, the pixel division is conducted.

Since the domain boundary is shifted as the voltage being applied is raised, the domain can be provided with a desired volume ratio (surface area). Thus, a single pixel region can be divided into a plurality of pixel domains according to the applied voltage.

(Twelfth embodiment)

Now, description will be made of a liquid crystal display device using a ferroelectric thin film which is not in a monocrystalline state.

Figure 38:
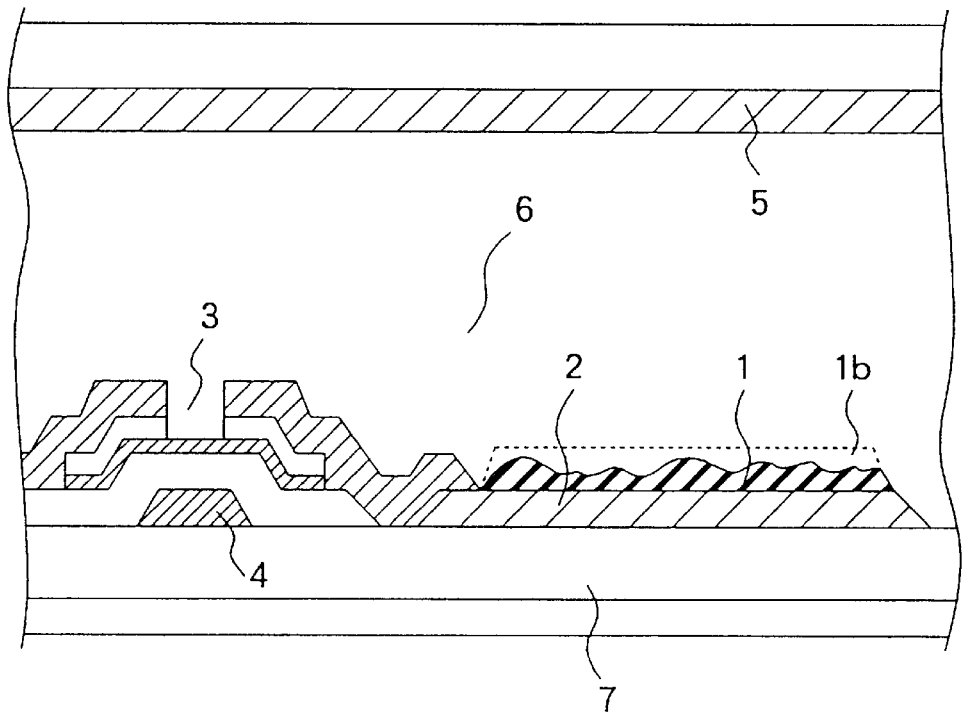

FIG. 38 is a schematic diagram showing a structure of the liquid crystal display device in this embodiment. Taking the application as a reflective liquid crystal display device into account, quartz glass was used as a substrate, and Pt which is stable at high temperatures was used as an electrode material. Any other materials may be used for the substrate and electrode material as long as such materials can withstand the temperature in the ferroelectric film forming process.

The electrode material is particularly significant because the growing direction of a ferroelectric thin film is determined according to its physical property.

First, a pixel electrode 2 and a gate electrode 7 were formed of Pt on a quartz substrate 7 at the same time.

A ferroelectric thin film 1 was formed on the pixel electrode 2. The pixel portion is required to be completed now because the ferroelectric thin film 1 can not be formed after forming a thin film transistor 3 due to a high temperature process (at about 400° C. or higher at present) to form the ferroelectric thin film 1.

At this time, the ferroelectric material is not restricted to inorganic substances which can be formed into a film by a CVD method, and a ferroelectric organic thin film can also be used.

Since the thin film is not limited to the monocrystal thin film, the film forming method can be a sputtering method or a sol-gel method. After forming the ferroelectric thin film, an ordinary thin film transistor forming process was used to form the liquid crystal display device.

An inverted staggered type thin film transistor 3 was used in this embodiment, but a staggered type can also be used. And, a pixel electrode and a source-drain electrode are formed into one body. Especially, the drain and the pixel electrode can be made in the same body.

In addition, a non-linear switching element by a two-terminal method can also be used. In the two-terminal method, a non-linear switching element using the hysteresis of a ferroelectric substance can be used as well.

Figure 39:
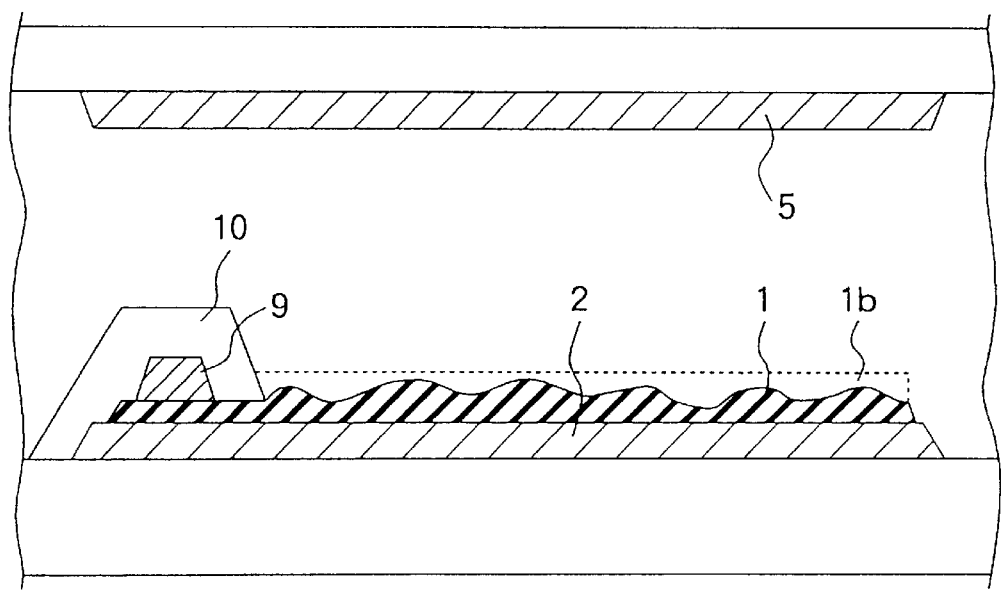

With the ferroelectric substance, the non-linear switching element section and a section for dividing the face on the pixel can be formed integrally by a single film forming. FIG. 39 shows the structure of the device produced. And, it is to be understood that the same can be applied to a simple matrix structure.

In the examples of the LCD of this invention shown in FIG. 37, FIG. 38, and FIG. 39, the ferroelectric layer 1 is formed so as to have a distribution in thickness. However, it is possible to form a paraelectric layer 1b on the ferroelectric layer 1 to make a flat surface and a uniformity in thickness of the lamination of both layers. Moreover, it is possible to form a ferroelectric layer having a uniformity in thickness and to make the layer having a distribution of the dielectric constants. The distribution of the dielectric constants is made by doping of ions into the ferroelectric layer, for example.

Figure 40:
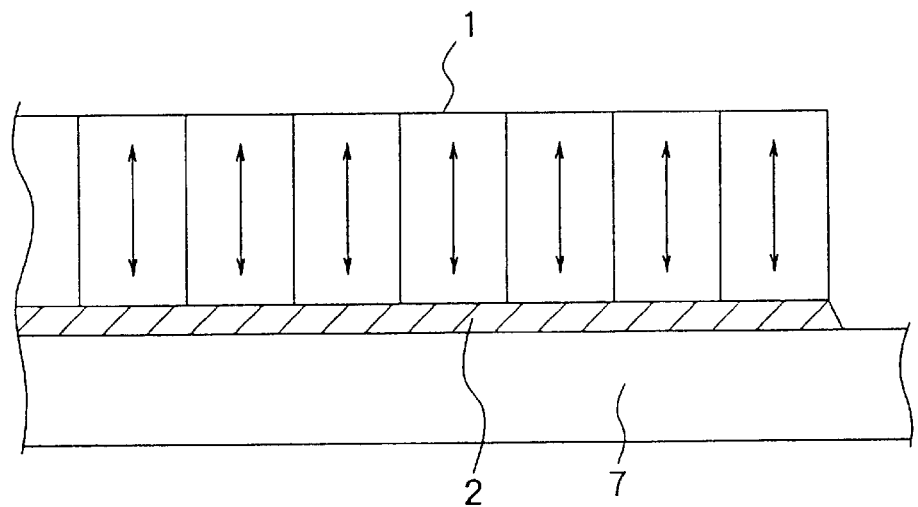
FIG. 40 a schematic diagram showing the microstructure of a ferroelectric thin film formed by heteroepitaxial growing.

To form the film, a CVD method which is one of vapor phase epitaxy was used in this embodiment. FIG. 40 shows a microstructure of the pixel section. The microstructure was an aggregate of columnar grains, which is called a columnar structure. And, it was found to be in a highly oriented state (generally called as epitaxial growth in a broad sense) with reference to an X-ray diffraction pattern. It is considered to owe to the matching of the lattice constant and thermal expansion with the pixel electrode material.

Such a structure indicates that most of the columnar grains can be grown in the same axial direction with respect to the vertical direction of the substrate.

They are random in an in-plane direction, for example, but are in a state oriented (100) in the vertical direction of the substrate. Therefore, the electrode material is selected so that the polarization axis is aligned in the vertical direction of the substrate, and a film having the microstructure and the polarization direction as shown in FIG. 40 can be formed.

When the surface area of each of the columnar grains is large enough for the liquid crystal to make an optical response, the columnar grains can be regarded as domains.

But, since the grain boundary cannot be shifted like the domain, every grain can be regarded as a plane-divided pixel (pixel domain).

In this embodiment, it is designed that the voltage applied to the respective columnar grains does not vary. Thus, the plane division in the pixel region can be achieved.

Figure 41:
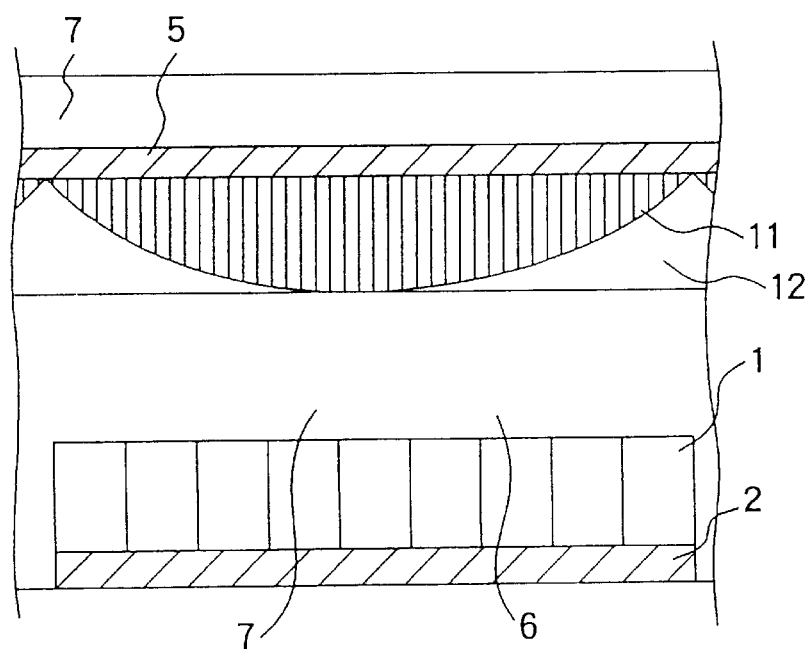
FIG. 41 is a schematic diagram showing the structure of a pixel in which the application of an electric field is not uniform.

FIG. 41 shows a structure of this device.

On an opposed electrode, a low dielectric material 11 was distributed in a uniform thickness within a single pixel by means of a wraparound effect of light. And, a high dielectric material 12 which has a low viscosity and can be formed into a film was formed flat as a film thereon.

Since an uneven voltage is applied to the ferroelectric thin film by forming a high dielectric layer in an uneven shape within a single pixel, the pixel can be divided into the pixel domains by utilizing the nonuniformity.

This changing aspect will be described below. It is assumed that polarization reversal takes place when a $V_{FE}$ voltage is applied to the ferroelectric thin film.

Figure 42:
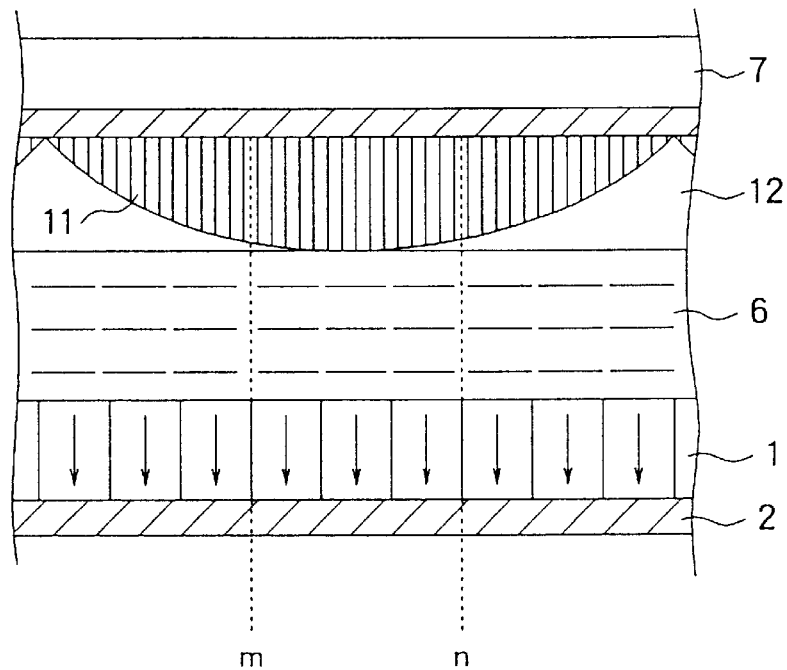
FIG. 42 is a schematic diagram showing the polarized state of domains and the oriented state of a liquid crystal in a polled state of the pixel of FIG. 41.

And, FIG. 42 shows a polled state after the application of $-V_{FE}$ to all the ferroelectric thin film sections.

The liquid crystal section at this time is assumed to be in a dark state owing to the remanence of the ferroelectric substance. Then, when a voltage was applied to the pixel so that a voltage to be applied to the ferroelectric substance at m and n became $V_{FE}$, a voltage of $V_{FE}$ or more is applied to the region between m and n of the ferroelectric substance, thereby causing polarization reversal. But, the polarization reversal does not take place in the regions other than the m-n region because a voltage applied is less than $V_{FE}$.

Figure 43:
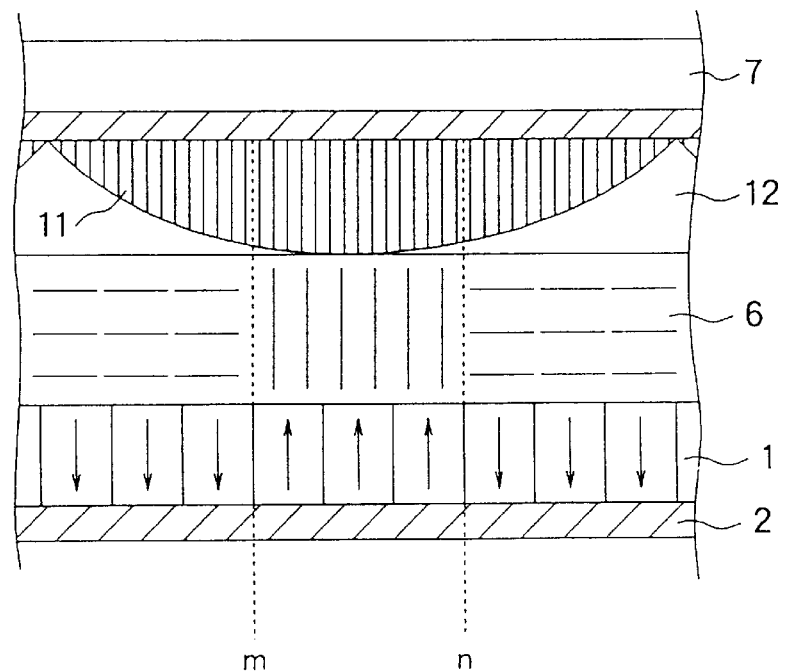
FIG. 43 is schematic diagram showing the polarized state of domains and the oriented state of a liquid crystal in a gradation display state of the pixel of FIG. 41.

Accordingly, it results in a state as shown in FIG. 43. When a voltage of V is applied to a single pixel, a region of the ferroelectric thin film to which a voltage of $V_{FE}$ or more is applied makes the polarization reversal, and the liquid crystal becomes a light state.

At this time, the voltage is also applied to the liquid crystal section. But, the polarization reversal of the ferroelectric substance is so fast as compared with the response speed of the liquid crystal, and switching is not caused by the voltage applied to the liquid crystal section. Thus, switching takes place corresponding to the remanence of the ferroelectric substance.

The voltage applied to the ferroelectric substance was controlled by means of the multilayered structure of the high dielectric layer and the low dielectric layer. But, the same effect can be obtained by varying the thickness of the ferroelectric thin film itself.

And, it is also possible to adopt a method that the ferroelectric thin film is distributed to have a different coercive electric field even when the same voltage is applied.

For example, it can be made by ion doping of the ferroelectric thin film. And, halftone can be displayed by ion doping so that an ion density (dosage) can be distributed within the pixel.

As described above, gradation display can be made by the liquid crystal display device of the invention without being restricted by the threshold property of a liquid crystal material.

And, gradation display can be made by the liquid crystal display device of the invention without deteriorating the remarkable properties such as a high-speed response and memory of the liquid crystal having sharp threshold properties.

Besides, full-color display can be achieved by the liquid crystal display device of the invention by controlling the domains of the ferroelectric film formed in a pixel region without providing a liquid crystal having a good threshold property with any special drive method or a complicated device structure.

Additionally, gradation display can be made by the liquid crystal display device of the invention without making the pixel electrode smaller.

Gradation display can be made by controlling the domains of the ferroelectric film formed in the pixel region according to the liquid crystal display device of the invention.

In addition, such a liquid crystal display device can be achieved by configuring it on the substrate according to the invention.

What is claimed is:

1. A liquid crystal display device having a plurality of pixels, comprising:

a liquid crystal layer driven by a data signal;

a plurality of thin film transistors for selecting the data signal, the thin film transistors being formed in respective pixels;

a ferroelectric layer wherein a polarized state is controlled corresponding to the data signal selected by the thin film translators, and the liquid crystal layer responding to the polarized state of the ferroelectric layer, wherein one or more gate electrodes of the thin film transistors are electrically connected to each of data lines of the liquid crystal display device, and a drain electrode of each of the thin film transistors is electrically connected to the ferroelectric layer.

2. A liquid crystal display device as set forth in claim 1, wherein the liquid crystal layer responds to a electromagnetic field formed by the ferroelectric layer.

3. A liquid crystal display device as set forth in claim 1, wherein the liquid crystal layer responds to a electromagnetic field formed by a conductive layer, the conductive layer is effected by the polarized state of the ferroelectric layer.

4. A liquid crystal display device as set forth in claim 1, wherein the liquid crystal layer responds to a polarization charge induced on the surface of the ferroelectric layer.

5. A liquid crystal display device having a plurality of pixels, comprising:

a liquid crystal layer intervened between a first substrate and a second substrate;

a plurality of first electrodes formed on the first substrate;

a plurality of thin film transistors for selecting the data signal and for applying the data signal to each of the first electrodes, each of the thin film transistors and the first electrodes being formed in respective pixels; and a ferroelectric layer formed on the first electrode so that at least a part of the ferroelectric layer interacts with the liquid crystal layer, wherein one or more gate electrodes of the thin film transistors are electrically connected to each of data lines of the liquid crystal display device, and a drain electrode of each of the thin film transistors is electrically connected to each of the first electrodes.

6. The liquid crystal display device as set forth in claim 5, wherein at least a part of the ferroelectric layer faces the liquid crystal layer.

7. The liquid crystal display device as set forth in claim 5, the liquid crystal display device further comprising second electrodes formed on the ferroelectric layer so that the ferroelectric layer and the liquid crystal layer interact with each other through the second electrodes, the second electrodes being formed in respective pixels.

8. A liquid crystal display device having a plurality of pixels, comprising:

a liquid crystal layer intervened between a first substrate and a second substrate;

a ferroelectric layer formed on the first substrate;

a plurality of first electrodes formed on the ferroelectric layer so that a potential of each of the first electrodes induces a polarization of the ferroelectric layer, the first electrodes being formed in respective pixels; and a plurality of thin film transistors formed in respective pixels for selecting the data signal and for applying the data signal to each of the first electrodes, wherein one or more gate electrodes of the thin film transistors are electrically connected to each of data lines of the liquid crystal display device, and a drain electrode of each of the thin film transistors is electrically connected to each of the first electrodes.

9. The liquid crystal display device as set forth in claim 8, the liquid crystal display device further comprising a plurality of second electrodes formed in respective pixels so that each of the second electrodes are electrically coupled with each of the first electrodes through the ferroelectric layer.

10. A liquid crystal display as set forth in claim 8, wherein the first electrode having at least one slit.

11. A liquid crystal display as set forth in claim 8, wherein the first electrode comprising a first finger having a first potential and a second finger having a second potential different from the first potential.

12. A liquid crystal display as set forth in claim 11, wherein the first finger and the second finger are placed onto the ferroelectric layer so that a electromagnetic field formed between the first and the second electrode induces a polarized direction which elongated in the plane of the ferroelectric layer.

13. A liquid crystal display as set forth in claim 11, wherein the ferroelectric layer having a first area having proximately a rectangular shape; and wherein the first finger formed elongated with a first side of the first area and the second finger formed elongated with a second side of the first area, and the first and second side of the first area are opposed.

14. A liquid crystal display device, comprising:

a liquid crystal layer intervened between a first substrate having a first electrode and a second substrate having a second electrode; and a ferroelectric layer formed on at least one of the first substrate or the second substrate so that the ferroelectric layer interacted with the liquid crystal layer, and the ferroelectric layer having a first region in a first thickness and a second region in a second thickness.

15. The liquid crystal display device as set forth in claim 14, wherein the liquid crystal display device is driven by a data signal; and wherein the liquid crystal display device further comprises:

the ferroelectric layer wherein a polarized state is controlled corresponding to the data signal selected by a selecting means; and the liquid crystal layer responding to the polarized state of the ferroelectric layer.

16. The liquid crystal display device as set forth in claim 14, the liquid crystal display device further comprising a selecting means for selecting the data signal and for applying the data signal to the first electrode; and wherein the ferroelectric layer being formed on the first electrode so that at least a part of the ferroelectric layer interacts with the liquid crystal layer.

17. The liquid crystal display device as set forth in claim 14, wherein at least a part of the ferroelectric layer faces the liquid crystal layer.

18. The liquid crystal display device as set forth in claim 14, the liquid crystal display device further comprising a third electrode formed on the ferroelectric layer so that the ferroelectric layer and the liquid crystal layer interact with each other through the third electrode.

19. The liquid crystal display device as set forth in claim 14, wherein the first electrode is formed on the ferroelectric layer so that a potential of the first electrode or the second electrode, on which the ferroelectric layer is formed, induces a polarization of the ferroelectric layer, and wherein the liquid crystal display device further comprises a selecting means for selecting a data signal and for applying the data signal to the first electrode.

20. The liquid crystal display device as set forth in claim 19, the liquid crystal display device further comprising a third electrode which is formed so that the third electrode can be electrically coupled with the first electrode or the second electrode, on which the ferroelecric layer is formed, through the ferroelectric layer.

21. The liquid crystal display device as set forth in claim 19, wherein the first electrode or the second electrode, on which the ferroelecric layer is formed, have at least one slit.

22. A liquid crystal display device, comprising:

a liquid crystal layer intervened between a first substrate having a first electrode and a second substrate having a second electrode;

a transparent layer formed on at least one of the first or the second substrate, the transparent layer formed of a plurality of single crystal; and a ferroelectric layer formed on the transparent layer wherein a polarized direction of the ferroelectric layer is substantially perpendicular to the substrate on which the transparent layer is formed, and wherein the liquid crystal layer interacts with the ferroelectric layer.

* * * * *

UNITED STATES PATENT AND TRADEMARK OFFICE
CERTIFICATE OF CORRECTION

PATENT NO. : 5,986,724
DATED : November 16, 1999
INVENTOR(S) : Akiyama et al.

It is certified that error appears in the above-identified patent and that said Letters Patent is hereby corrected as shown below:

Claim 1, column 31, line 13, change "translators" to --transistors--.

Claim 10, column 32, line 16, change "the first electrode having" to --each of the first electrodes have--.

Claim 20, column 33, line 15, change "ferroelecric" to --ferroelectric--.

Claim 21, column 34, line 3, change "ferroelecric" to --ferroelectric--.

Signed and Sealed this

Twenty-seventh Day of February, 2001

Attest:

NICHOLAS P. GODICI

Attesting Officer

Acting Director of the United States Patent and Trademark Office